US010095699B2

(12) United States Patent
Ueda et al.

(10) Patent No.: US 10,095,699 B2
(45) Date of Patent: Oct. 9, 2018

(54) COMPUTER-READABLE RECORDING MEDIUM, EXECUTION CONTROL METHOD, AND INFORMATION PROCESSING APPARATUS

(71) Applicant: FUJITSU LIMITED, Kawasaki-shi, Kanagawa (JP)

(72) Inventors: Haruyasu Ueda, Ichikawa (JP); Takamitsu Maeda, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 398 days.

(21) Appl. No.: 14/048,354

(22) Filed: Oct. 8, 2013

(65) Prior Publication Data

US 2014/0101213 A1 Apr. 10, 2014

(30) Foreign Application Priority Data

Oct. 9, 2012 (JP) ................................. 2012-224604

(51) Int. Cl.
*G06F 17/30* (2006.01)

(52) U.S. Cl.
CPC .. *G06F 17/30076* (2013.01); *G06F 17/30194* (2013.01)

(58) Field of Classification Search
CPC ................................................ G06F 17/30076
USPC ........................................................ 707/827
See application file for complete search history.

(56) References Cited

U.S. PATENT DOCUMENTS

| 8,321,454 | B2 * | 11/2012 | Berlyant | ............... | G06F 9/5066 707/770 |
| 8,938,416 | B1 * | 1/2015 | Cole | ................. | G06F 17/30592 707/607 |
| 9,170,848 | B1 * | 10/2015 | Goldman | ............... | G06F 9/5066 |
| 2008/0052261 | A1 * | 2/2008 | Valenci | ............. | G06F 17/30067 |
| 2008/0120314 | A1 * | 5/2008 | Yang | ................. | G06F 17/30498 |
| 2010/0257198 | A1 * | 10/2010 | Cohen | ............... | G06F 17/30557 707/770 |
| 2011/0302151 | A1 * | 12/2011 | Abadi | ............... | G06F 17/30445 707/714 |
| 2012/0254193 | A1 * | 10/2012 | Chattopadhyay | ........................... | G06F 17/30979 707/747 |
| 2012/0311581 | A1 * | 12/2012 | Balmin | ................. | G06F 9/5066 718/100 |

(Continued)

OTHER PUBLICATIONS

J. Dean, "MapReduce: Simplified Data Processing on Large Clusters," *OSDI '04: 6th Symposium on Operating Systems Design and Implementation*, pp. 137-149.

(Continued)

*Primary Examiner* — Rehana Perveen
*Assistant Examiner* — Hicham Skhoun
(74) *Attorney, Agent, or Firm* — Staas & Halsey LLP

(57) ABSTRACT

A slave computer reads a plurality of input files that have different formats and generates, for each of the input files, an intermediate file that has added thereto, as a join key, data in a type of column that is common to the input files. The slave computer sorts data in each intermediate file in accordance with the join key. The slave computer extracts, from each intermediate file that has data sorted therein, data that has the format of each of the input files so as to generate a plurality of output files that have data sorted therein with respect to each of the input files. The slave computer inputs the plurality of output files generated to a join program that joins data.

10 Claims, 18 Drawing Sheets

(56) References Cited

U.S. PATENT DOCUMENTS

| | | | | |
|---|---|---|---|---|
| 2013/0318277 A1* | 11/2013 | Dalal | ............... | G06F 13/1652 |
| | | | | 710/308 |
| 2013/0339972 A1* | 12/2013 | Zhang | ............... | G06F 9/5066 |
| | | | | 718/104 |
| 2013/0345999 A1* | 12/2013 | Hafen | ............... | G01R 21/133 |
| | | | | 702/60 |
| 2015/0019562 A1* | 1/2015 | Bulkowski | ........ | G06F 17/30545 |
| | | | | 707/741 |
| 2015/0113535 A1* | 4/2015 | Goda | ................. | G06F 9/466 |
| | | | | 718/101 |

OTHER PUBLICATIONS

"Hadoop Streaming," http://hadoop.apache.org/docs/r1.0.3/streaming.html, May 2012, 7 pages.
"Reduce-Side Joins," pp. 249-252.

* cited by examiner

FIG.3

| JOB SETTINGS |
|---|
| INPUT DATA FILE NAME 01=<br>   /usr/transaction.txt |
| INPUT DATA FILE NAME 02=<br>   /usr/master.txt |
| INPUT FORMAT PROCESSING CLASS NAME 01=<br>   FIXED-LENGTH FORMAT |
| INPUT FORMAT PROCESSING OPTION 01=<br>   RECORD LENGTH: 80 BYTE |
| INPUT FORMAT PROCESSING CLASS NAME 02=<br>   WITH-LINEFEED FORMAT |
| INPUT FORMAT PROCESSING OPTION 02=<br>   LINEFEED CODE: \r\n |
| REDUCE APPLICATION=<br>   a.out %in01 %in02 %out01 %out02 |
| INPUT FILE ENVIRONMENT VARIABLE NAME 01=<br>   TRAN |
| INPUT FILE ENVIRONMENT VARIABLE NAME 02=<br>   MASTAR |
| OUTPUT DATA DIRECTORY NAME=<br>   /output/ |
| OUTPUT FILE NAME 01=<br>   processed.txt |
| OUTPUT FILE NAME 02=<br>   error.txt |
| OUTPUT FILE ENVIRONMENT VARIABLE NAME 01=<br>   PROCOUT |
| OUTPUT FILE ENVIRONMENT VARIABLE NAME 02=<br>   ERROUT |
| SORT KEY 01=<br>   4 BYTE TO 8 BYTE |
| SORT KEY 02=<br>   12 BYTE TO 16 BYTE |

FIG.4

| TASK ID | INPUT INFORMATION | | CLASS NAME |
|---|---|---|---|
| task_m_1 | FILE NAME=/usr/transaction.txt | FORMAT PROCESSING=MAIN FORMAT PROCESSING 01 |
| | START POSITION=0 | MAP OPERATION=MAIN MAP OPERATION 01 |
| | SIZE=1000 | |
| task_m_2 | FILE NAME=/usr/transaction.txt | FORMAT PROCESSING=MAIN FORMAT PROCESSING 01 |
| | START POSITION=1001 | MAP OPERATION=MAIN MAP OPERATION 01 |
| | SIZE=1000 | |
| task_m_3 | FILE NAME=/usr/transaction.txt | FORMAT PROCESSING=MAIN FORMAT PROCESSING 01 |
| | START POSITION=2001 | MAP OPERATION=MAIN MAP OPERATION 01 |
| | SIZE=1000 | |
| task_m_4 | FILE NAME=/usr/master.txt | FORMAT PROCESSING=MAIN FORMAT PROCESSING 02 |
| | START POSITION=0 | MAP OPERATION=MAIN MAP OPERATION 02 |
| | SIZE=1000 | |
| task_m_5 | FILE NAME=/usr/master.txt | FORMAT PROCESSING=MAIN FORMAT PROCESSING 02 |
| | START POSITION=1001 | MAP OPERATION=MAIN MAP OPERATION 02 |
| | SIZE=1000 | |

FIG.5

| TASK ID | MAP RESULT INFORMATION | | CLASS NAME |
|---|---|---|---|
| | MAP TASK ID | SLAVE COMPUTER NAME | |
| task_r_1 | task_m_1 | SLAVE COMPUTER 20 | MAIN REDUCE CLASS |
| | task_m_2 | SLAVE COMPUTER 30 | |

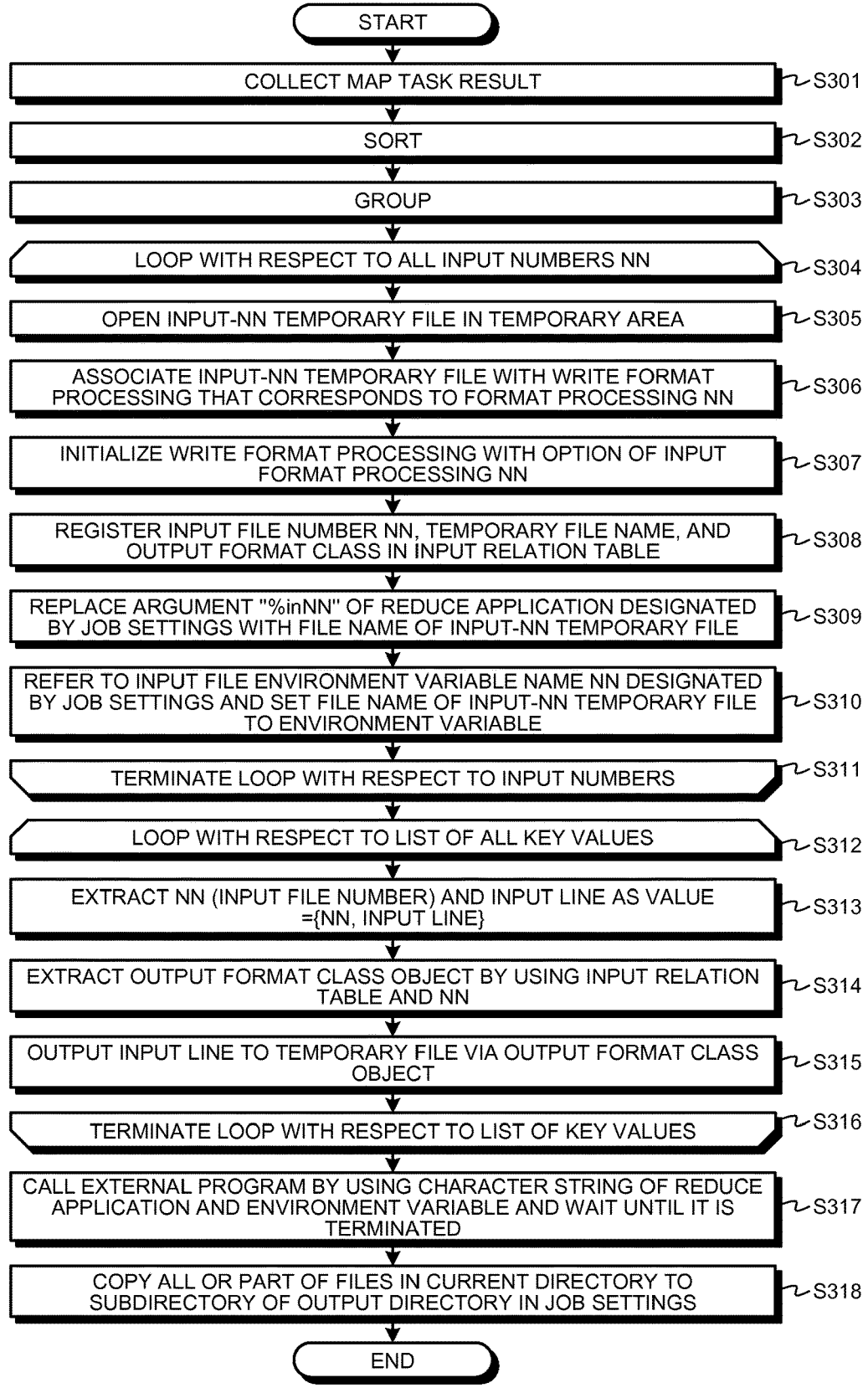

COMPUTER-READABLE RECORDING MEDIUM, EXECUTION CONTROL METHOD, AND INFORMATION PROCESSING APPARATUS

CROSS-REFERENCE TO RELATED APPLICATION

This application is based upon and claims the benefit of priority of the prior Japanese Patent Application No. 2012-224604, filed on Oct. 9, 2012, the entire contents of which are incorporated herein by reference.

FIELD

The embodiments discussed herein are related to an execution control program, an execution control method, and an information processing apparatus.

BACKGROUND

As cloud computing has widespread, distributed processing systems have been utilized in which multiple servers perform distributed processing on the large amount of data stored on the cloud. Hadoop (registered trademark) that uses the Hadoop Distributed File System (HDFS) and MapReduce as its infrastructure technologies is known as a distributed processing system.

The HDFS is a file system that distributes and stores data to a plurality of servers. MapReduce is a system that performs distributed processing on data of the HDFS on what is called a per task basis and that performs a Map operation, a shuffle/sort operation, and a Reduce operation. A Map operation and a Reduce operation are typically developed by using Java (registered trademark), and a shuffle/sort operation is provided with Hadoop as a standard feature. Typically, the above Hadoop processes one type of input by MapReduce and produces one type of output.

In recent years, application programs (hereafter, referred to as "external program" as appropriate) for batch processing or the like have been efficiently executed by using Hadoop, such programs being not provided with Hadoop as standard features. The external program uses multiple inputs that have different formats as a target for processing and is typically developed by using a program of other than Java (registered trademark).

For example, Hadoop Streaming that is the standard tool of Hadoop has been known as a technology for executing an external program with Hadoop. Hadoop Streaming is a technology for calling the external program during a Map operation or Reduce operation. Specifically, during a Map operation or Reduce operation, the external program is called once for a single task, and the operation result is output to the standard output of the external program.

Furthermore, a reduce-side join has been known as a Hadoop related technology for processing multiple types of inputs. For example, when the external program for a join operation is to be executed, the input file name, the class for processing the input format, and the class for performing a Map operation are defined for each type of input so that a Map operation is performed, and then data is output in which a join key is related to tuple that is to be joined. Next, during a shuffle/sort operation, data sets are sorted by using a join key, and the data sets are grouped by each join key for output. Afterward, a Reduce class is defined for each type of input so that a Reduce operation is performed, and then a join operation is performed.

[Non-patent Document 1] Dean and S. Ghemawat, "MapReduce: Simplified Data Processing on Large Clusters", Proceedings of the 6th Symposium on Operating Systems Design and Implementation, pp. 137-150, Dec. 6, 2004.

[Non-patent Document 2] Apache Hadoop 1.0.3 documentation, "Hadoop Streaming", URL "http://hadoop.apache.org/docs/r1.0.3/streaming.html"

[Non-patent Document 3] Tom White, Hadoop 2nd Edition, 8.3.2 reduce-side join, P269-272, O'Reilly Japan, issued on July, 2011

Because there are many constraints on the execution of the external program, which uses multiple inputs as a target for processing, in the distributed processing system, such as Hadoop, the reality is that the execution of the external program in the distributed processing system is difficult.

Specifically, with Hadoop Streaming, the data to be processed is output through the standard input/output; therefore, it is difficult to call and execute the external program that receives the to-be-processed data with the argument or environment variable.

As for a reduce-side join, the program that performs the same operation as that of the existing external program is redeveloped and ported in Hadoop; therefore, because of the risk of redevelopment and porting, it is difficult to port the external program on a frequent basis, which results in low development possibility.

For example, when a reduce-side join is used, a Map operation class that is to be processed during a Map operation is implemented for each input to be processed by the external program, and a Reduce operation class that is to be processed during a Reduce operation is implemented for each input. Furthermore, when the above classes are implemented, data is defined by using a key value store (KVS) format that is different from that of relational database (RDB) files or comma separated values (CSV) files that are obtained by unloading RDB files, the RDB and CSV files being to be processed by the external program. Moreover, if the program is developed by other than Java, it is redeveloped by Java for porting so that the program can be called during a Reduce operation of the reduce-side join.

That is, when the reduce-side join is used, a Map operation and Reduce operation are performed as if multiple types of inputs are one type of input, and the ported external program is called and executed during the Reduce operation.

However, a Map class and Reduce class are manually implemented without the support of devices with respect to complicated data that includes hundreds of columns to be processed by the external program, which results in an increase in the time and the risk of human-caused mistakes. Furthermore, porting an external program has a high risk and it is not a desirable method. That is because complicated operational logics are implemented in the external program and many tests have been repeatedly performed on it so that the actual executions are abundant; therefore, porting of the external program is not easy.

As described above, when the external program is executed by using Hadoop Streaming or a reduce-side join, there are an increase in the operating time, an increase in human-caused mistakes, and the risk associated with porting of the external program; therefore, it is difficult to execute the external program with Hadoop, and the development possibility of Hadoop is decreased.

SUMMARY

According to an aspect of an embodiment, a computer-readable recording medium stores an execution control program casing a computer to execute a process including inputting a plurality of input files that have different formats; generating, for each of the input files, an intermediate file that has added thereto, as a join key, data in a type of column that is common to the input files; sorting data in each intermediate file in accordance with the join key; extracting, from each intermediate file that has data sorted therein, data that has a format of each of the input files and generating a plurality of output files that have data sorted therein with respect to each of the input files; and inputting the plurality of output files generated to a join program that processes joining data.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 3 is a diagram that illustrates an example of information stored in a setting file DB;

FIG. 4 is a diagram that illustrates an example of information stored in a task list DB;

FIG. 5 is a diagram that illustrates an example of Reduce task information transmitted to a slave computer;

FIG. 9 is a flowchart that illustrates the flow of a Reduce operation according to the first embodiment;

DESCRIPTION OF EMBODIMENTS

Preferred embodiments of the present invention will be explained with reference to accompanying drawings. The present invention is not limited to the embodiments.

[a] First Embodiment

Overall Configuration

Figure 1:
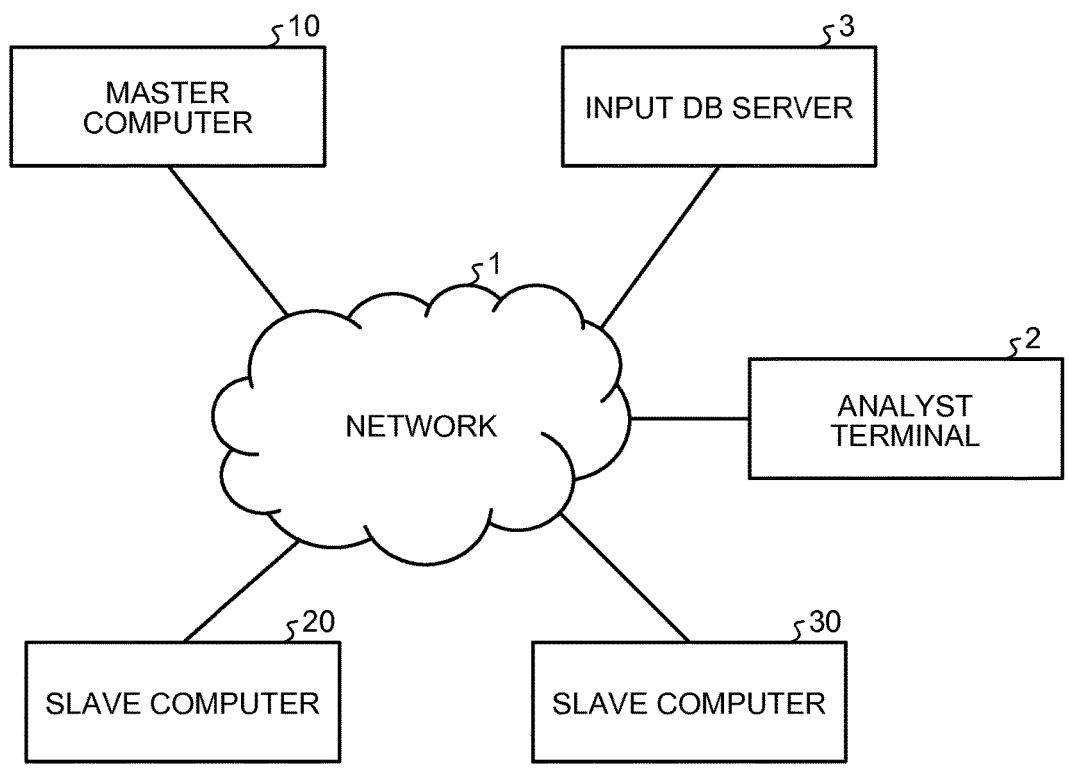
FIG. 1 is a diagram that illustrates an example of the overall configuration of a distributed processing system according to a first embodiment.

FIG. 1 is a diagram that illustrates an example of the overall configuration of a distributed processing system according to a first embodiment. As illustrated in FIG. 1, an analyst terminal 2, an input database (DB) server 3, a master computer 10, a slave computer 20, and a slave computer 30 are communicatively connected to one another via a network 1 in the distributed processing system.

In the distributed processing system, each computer executes a distributed processing application that uses a distributed processing framework, such as Hadoop (registered trademark), and the HDFS, or the like, is used as a data infrastructure. The analyst terminal 2 is a user terminal that uses the distributed processing system, executes an external program implemented by using a framework that is different from the distributed processing framework, and then analyzes data.

The input DB server 3 is a database server that stores therein multiple types of input files that are to be processed by the external program. For example, the input DB server 3 stores therein a product master DB and a sales specification DB. The DBs stored in the input DB server 3 are made up of, for example, RDB files, or CSV files that are obtained by unloading RDB files.

The master computer 10 is a server that manages the distributed processing system in an integrated manner. For example, the master computer 10 manages which data is stored in which slave computer and manages tasks, jobs, and the like, that are assigned to each slave computer.

The slave computer 20 and the slave computer 30 are servers that have implemented the distributed processing application, perform a Map operation and Reduce operation, and perform distributed processing on data managed by the HDFS. Each of the slave computers reads multiple input files that have different formats and generates, for each of the input files, an intermediate file that has added thereto, as a join key, data in a type of column that is common to the input files. Each slave computer sorts data sets in each intermediate file in accordance with the join key. Each slave computer then extracts, from each intermediate file that has data sets sorted therein, data that has the format of each of the input files and generates multiple output files that have data sets sorted therein with respect to each of the input files. Afterward, each slave computer inputs the generated output files to the join program that joins data sets.

Thus, when each slave computer calls, with Hadoop, the external program, such as the join program, that has a different framework to that of Hadoop, the slave computer extracts a join key from each input file, sorts data sets with the join key, and generates a new file in accordance with the settings of the join program. Each slave computer then designates the new file as an input file and calls the join program.

Specifically, each slave computer creates a constraint such that, when multiple types of input files are to be read in Hadoop, the external program directly reads the input files.

Hence, with the given settings of the external program, each slave computer can call the external program that processes the multiple types of input files. Thus, it is possible to reduce constraints on the execution of the external program, which uses multiple inputs as a target for processing, in the distributed processing system.

Configuration of Master Computer

Figure 2:
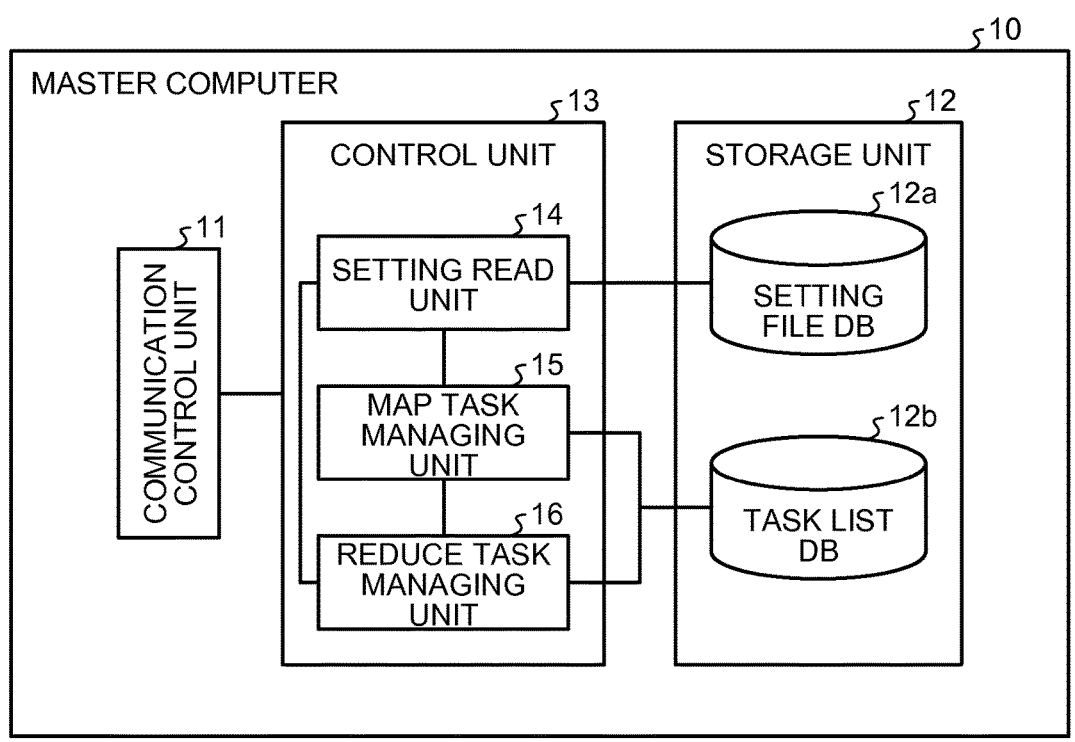
FIG. 2 is a functional block diagram that illustrates the functional configuration of a master computer according to the first embodiment.

FIG. 2 is a functional block diagram that illustrates the functional configuration of the master computer according to the first embodiment. As illustrated in FIG. 2, the master computer 10 includes a communication control unit 11, a storage unit 12, and a control unit 13. The communication control unit 11 is, for example, a network interface card, or the like. The storage unit 12 is a storage device, such as a memory or hard disk. The control unit 13 is an electronic circuit, such as a processor.

The communication control unit 11 is a processing unit that transmits and receives information to and from each slave computer, the analyst terminal 2, and the input DB server 3. For example, the communication control unit 11 receives a Map request or Reduce request from each of the slave computers and transmits Map task information or Reduce task information to each of the slave computers. Furthermore, the communication control unit 11 receives an input file, or the like, from the input DB server 3.

The storage unit 12 is a storage unit that stores therein a setting file DB 12a and a task list DB 12b. Furthermore, the storage unit 12 stores therein a temporary area to store various processes that are in progress, a distributed processing application, and the like.

The setting file DB 12a stores therein a setting file that is set in accordance with the operation details of the external program implemented by using a framework other than the distributed processing framework, such as a Java framework. The conditions stored therein are set by an administrator, or the like. Moreover, the external program corresponds to a join program that is implemented by using, for example, NetCOBOL (registered trademark), or the like.

FIG. 3 is a diagram that illustrates an example of information stored in the setting file DB. FIG. 3 illustrates a case where the number of input files is two and the number of output files is two. The input files are different types of files that are to be processed by the join program. The output files are shared files on the shared directory on HDFS file system or file systems alike that stores therein the result of the external program executed by each slave computer.

As illustrated in FIG. 3, the setting file DB 12a stores therein various conditions that are set for job settings. Specifically, the input data file name, the input format processing class name, the input format processing option, and the input file environment variable name are set for each of the input files in the setting file.

For example, "/usr/transaction.txt" is set as the input data file name 01. This indicates that one of the input files is "/usr/transaction.txt". Furthermore, "fixed-length format" is set as the input format processing class name 01. This indicates that a fixed-length format is used when the input file is reconfigured. Moreover, "record length:80BYTE" is set as the input format processing option 01. This indicates that, when the input file is reconstructed, it is reconfigured with the size of 80 bytes. Furthermore, "TRAN" is set as the input file environment variable name 01. This indicates that the input file 01 is a transaction file.

Further, the output data directory name, the output file name, and the output file environment variable name are set in the setting file. For example, "/output" is set as the output data directory name. This indicates that "/output" is set as the HDFS directory to which each slave computer outputs the operation result of the external program. Moreover, "processed.txt" is set as the output file name 01. This indicates that the result of operation normally terminated by the slave computer 20 is output to the file "processed.txt" in "/output". As illustrated in FIG. 3, the setting is also made such that, when an error occurs, the result is output to the file "errord.txt" in "/output". Moreover, "PROCOUT" is set as the output file environment variable name. This indicates that "PROCOUT" is designated as the environment variable of the output file.

Further, the Reduce application and the sort key are set in the setting file. For example, "a.out % in01% in02% out01% out02" is set as the Reduce application. This indicates that, when the input files are forwarded to the external program, the first input file is forwarded as the first argument and the second input file is forwarded as the second argument. Moreover, "4BYTE~8BYTE" is set as the sort key 01. This indicates that "4BYTE~8BYTE" in the input file 01 is used as the sort key.

The task list DB 12b stores therein a task list of a Map operation or Reduce operation generated by a Map task managing unit 15, or the like. FIG. 4 is a diagram that illustrates an example of information stored in the task list DB. As illustrated in FIG. 4, the task list DB 12b stores therein "task ID, input information, class name". Here, the "task ID" is an identifier that identifies a task, the "input information" indicates information that is to be processed as input data, and the "class name" indicates the name of a class that is to be processed during a Map operation.

For example, with regard to the task ID "task_m_1", the file name "/usr/transaction.txt", "start position=0", and "size=1000" are set as the input information, and "format processing=main format processing 01" and "Map operation=main Map operation 01" are set as the class name. This indicates that, during the Map operation 01 that uses the input format 01, the 0th byte to the 1000th byte of "/usr/transaction.txt" are used as input data. Using the input format 01 means using the conditions that correspond to "01" among the set conditions with regard to the input file, for example, as illustrated in FIG. 3.

With reference back to FIG. 2, the control unit 13 is a processing unit that includes a setting read unit 14, the Map task managing unit 15, and a Reduce task managing unit 16 and, by using the above units, controls a Map operation and Reduce operation performed by each slave computer.

The setting read unit 14 is a processing unit that reads a setting file from the setting file DB 12a and notifies the Map task managing unit 15 or the Reduce task managing unit 16 of various conditions set in the setting file. Furthermore, the setting read unit 14 notifies each slave computer of various conditions set in the setting file.

The Map task managing unit 15 is a processing unit that manages a Map task executed by each slave computer. For example, in order to prepare a Map task, the Map task managing unit 15 partitions the input file by a predetermined size, starting from the beginning thereof, changes the class names of the format processing and the Map operation by using the number of the input file, and registers it in the task list DB 12b.

Furthermore, when receiving a task request from each slave computer, the Map task managing unit 15 returns Map task information and assigns a Map task to each slave computer. For example, the Map task managing unit 15 reads the record with the task ID "task_m_1" from the task list DB 12b and transmits it to the slave computer 20.

The Reduce task managing unit 16 is a processing unit that manages a Reduce task executed by each slave computer. Specifically, when receiving a task request from each slave computer, the Reduce task managing unit 16 returns Reduce task information and assigns a Reduce task to each slave computer. FIG. 5 is a diagram that illustrates an example of Reduce task information transmitted to a slave computer. As illustrated in FIG. 5, the Reduce task information transmitted to a slave computer is stored such that "task ID, Map result information, class name" are related to each other.

The "task ID" is an identifier that identifies a Reduce task. The "Map result information" is information for specifying the result of a Map operation. The "class name" indicates the name of a class that is to be processed during a Reduce operation. In the case illustrated in FIG. 5, the Reduce task with the task ID "task_r_1" indicates that a Reduce operation is performed by using the result of the Map operation with the Map task ID "task_m_1" performed by the slave computer 20 and using the result of the Map operation with the Map task ID "task_m_2" performed by the slave computer 30. "Main Reduce class" is set as the class name with respect to the Reduce task with the task ID "task_r_1".

Configuration of Slave Computer

Figure 6:
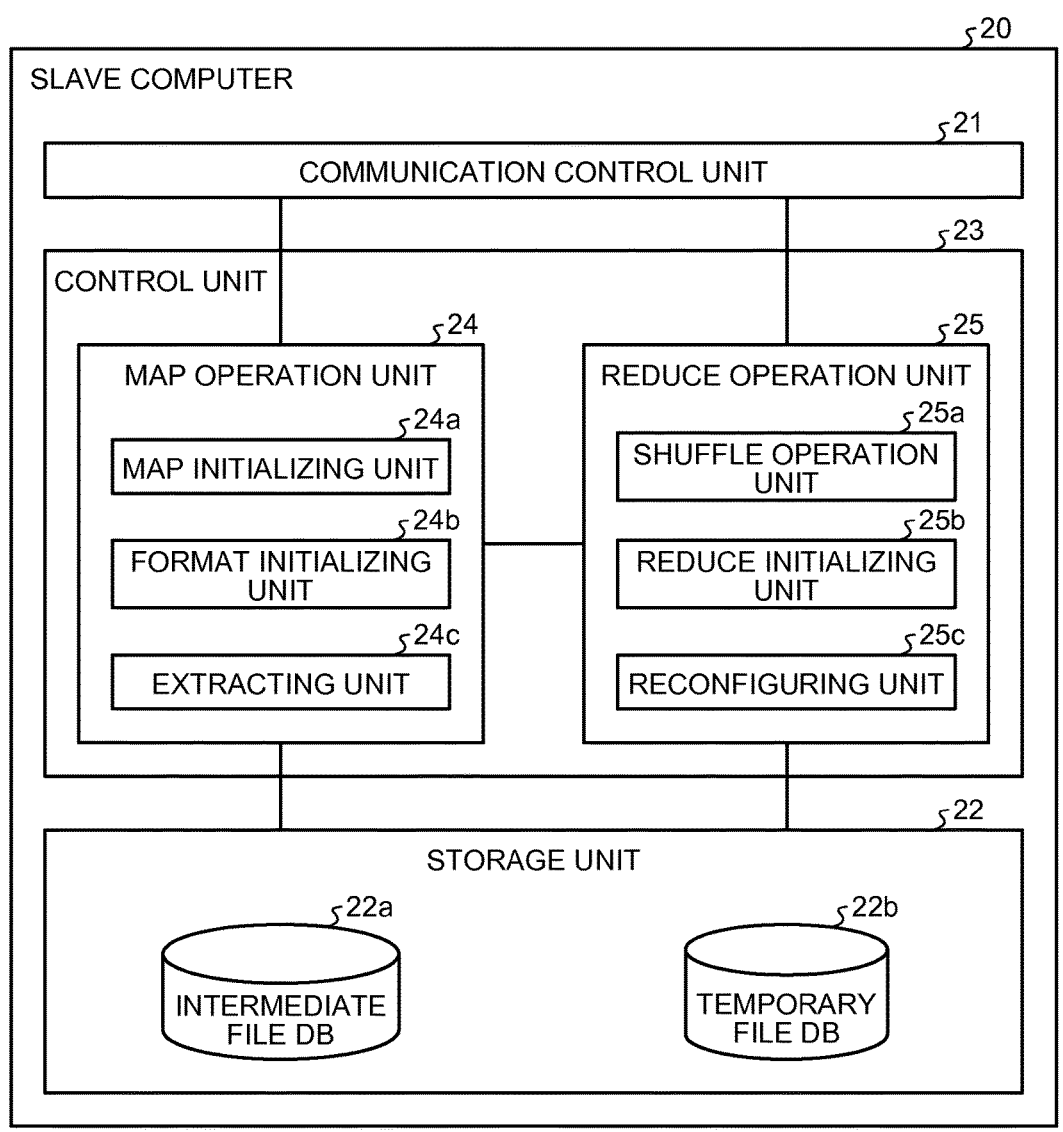
FIG. 6 is a functional block diagram that illustrates the functional configuration of the slave computer according to the first embodiment.

Next, an explanation is given of slave computers. Because the slave computer 20 and the slave computer 30 have the same configuration, an explanation is given here of the slave computer 20. FIG. 6 is a functional block diagram that illustrates the functional configuration of the slave computer according to the first embodiment. As illustrated in FIG. 6, the slave computer 20 includes a communication control unit 21, a storage unit 22, and a control unit 23. The communication control unit 21 is, for example, a network interface card, or the like. The storage unit 22 is a storage device, such as a memory or hard disk. The control unit 23 is an electronic device, such as a processor.

The communication control unit 21 is a processing unit that transmits and receives information to and from the master computer 10, the input DB server 3, and the analyst terminal 2. For example, the communication control unit 21 transmits a Map task request or Reduce task request to the master computer 10 and receives Map task information or Reduce task information from the master computer 10. Furthermore, the communication control unit 21 receives input files, and the like, from the input DB server 3.

The storage unit 22 is a storage unit that stores therein an intermediate file DB 22a and a temporary file DB 22b. Furthermore, the storage unit 22 stores therein the distributed processing application, the external program, input files or input data acquired from the input DB server 3, and the like.

The intermediate file DB 22a stores therein input files or input data read by the control unit 23, or the like, and the results of a Map operation and Reduce operation. Specifically, the intermediate file DB 22a stores therein, for example, the results of operations performed before the slave computer 20 calls the external program. The temporary file DB 22b stores therein the results of operations performed by the external program.

The control unit 23 is a processing unit that includes a Map operation unit 24 and a Reduce operation unit 25 and, by using the above units, performs a Map operation and Reduce operation and also calls and executes the external program. The Map operation unit 24 is a processing unit that includes a Map initializing unit 24a, a format initializing unit 24b, and an extracting unit 24c and, by using the above units, performs a Map operation.

The Map initializing unit 24a is a processing unit that performs initialization on a Map task in accordance with Map task information received from the master computer 10. Specifically, according to the setting file, the Map initializing unit 24a makes settings on which format is used to read the input file and how the sort key is read.

For example, the Map initializing unit 24a extracts "main Map operation 01" from the received Map task information. The Map initializing unit 24a then extracts "01" from the extracted "main Map operation 01" and acquires, from the setting file, "sort key 01=4BYTE~8BYTE" that corresponds to "01". The Map operation unit 24 then outputs the acquired information to the format initializing unit 24b, the extracting unit 24c, the Reduce operation unit 25, and the like.

The format initializing unit 24b is a processing unit that performs initialization on the format of an intermediate file to which the execution result of a Map operation is output. Specifically, the format initializing unit 24b assigns an adapter to each input file to read multiple inputs.

For example, the format initializing unit 24b acquires, from the setting file, the input format processing class name, the input format processing option, and the like, that correspond to "01" of the "main Map operation 01" received from the Map initializing unit 24a and then performs initialization. Here, the format initializing unit 24b acquires "input format processing class name 01=fixed-length format", "input format processing option 01=record length (80BYTE)", and the like.

The extracting unit 24c is a processing unit that performs a Map operation, extracts appropriate data from the input file, or the like, and generates an intermediate file. Specifically, the extracting unit 24c reads each record of the input file with the format set by the format initializing unit 24b. The extracting unit 24c then extracts the sort key from the input and determines it as Key of the Map output. Furthermore, the extracting unit 24c outputs the result of a Map operation by using, as part of Key or Value, the file index indicating what number is the input and using, as part of Key or Value, the whole of the read record.

For example, the extracting unit 24c extracts the sort key from a record (input line) of the input file in accordance with "sort key 01=4BYTE~8BYTE" received from the Map initializing unit 24a. The extracting unit 24c then generates an intermediate file in which the extracted sort key is related to the input line from which the sort key has been extracted and then stores the intermediate file in the intermediate file DB 22a. That is, the extracting unit 24c generates a KVS-format intermediate file in which the sort key is Key and the input line is Value. The master computer 10 receives the information about the intermediate file stored in it and manages the result of a Map operation.

The Reduce operation unit 25 includes a Shuffle operation unit 25a, a Reduce initializing unit 25b, and a reconfiguring unit 25c. The Reduce operation unit 25 is a processing unit that, by using the above units, calls the external program and performs a Reduce operation. Specifically, the Reduce operation unit 25 generates multiple output files that are appropriate for the external program and calls the external program.

The Shuffle operation unit 25a is a processing unit that performs a shuffle/sort operation that is performed in a reduce-side join of Hadoop, or the like. For example, the Shuffle operation unit 25a transmits a Reduce task request to the master computer 10 and receives Reduce task information. In accordance with Map result information in the received Reduce task information, the Shuffle operation unit 25a collects, from each slave computer, the Map operation result that is subjected to the shuffle/sort operation of this computer and then stores it in the intermediate file DB 22a. By way of example, the Shuffle operation unit 25a acquires the result of the Map operation with the Map task ID "task_m_2" from the slave computer 30 and acquires the result of the Map operation with the Map task ID "task_m_1" from the intermediate file DB 22a of this computer. A Hadoop distribution technique is used as the assignment technique.

Afterward, the Shuffle operation unit 25a sorts the collected Map operation results by using the sort key extracted by the extracting unit 24c. The Shuffle operation unit 25a then groups the sorted results by an identical key and stores them in the intermediate file DB 22a. The result of the shuffle/sort operation, which is performed by each slave computer in a distributed manner, is collected from each slave computer and managed by the master computer 10.

The Reduce initializing unit 25b is a processing unit that, at the previous step of a Reduce operation, performs initialization in accordance with the Reduce task information acquired by the Shuffle operation unit 25a. Specifically, the Reduce initializing unit 25b makes settings on how the external program is called and how the input file is forwarded.

For example, the Reduce initializing unit 25b designates "a.out % in01% in02 % out01% out02" so that the first input file is forwarded as the first argument in the external program. Furthermore, the Reduce initializing unit 25b designates "ENVNAME.01=TRAN" so as to make settings such that the file name of the input file 01 is set to the environment TRAN variable and the external program is called.

Moreover, the Reduce initializing unit 25b determines the file name that is appropriate for an input to the external program and makes a preparation to call the external program by using the determined file name. For example, the Reduce initializing unit 25b replaces the argument "% in01" of the call command with "./in01" or sets the file name "./in01" to the user-established environment variable TRAN.

The reconfiguring unit 25c uses information initialized by the Reduce initializing unit 25b so as to perform the Reduce task designated by the master computer 10 and generate an output file. The reconfiguring unit 25c is a processing unit that designates the output file as an input file and executes the external program. Specifically, the reconfiguring unit 25c performs the Reduce task designated by the master computer 10 and, in accordance with the operation result of the Shuffle operation unit 25a, reads an appropriate record and writes it in an appropriate file.

At this time, the reconfiguring unit 25c reconverts the KVS-format operation result that is output from the Shuffle operation unit 25a into data with the same file format as that of the original input file. The reconfiguring unit 25c then designates the position of the corresponding file set by the Reduce initializing unit 25b as argument or environment variable and then calls and executes the external program.

Furthermore, the reconfiguring unit 25c stores the result obtained by executing the external program in the temporary file DB 22b. At this point, the reconfiguring unit 25c can distinguish normal results and error results and output them in accordance with the setting file, or the like.

Sequence

Figure 7:
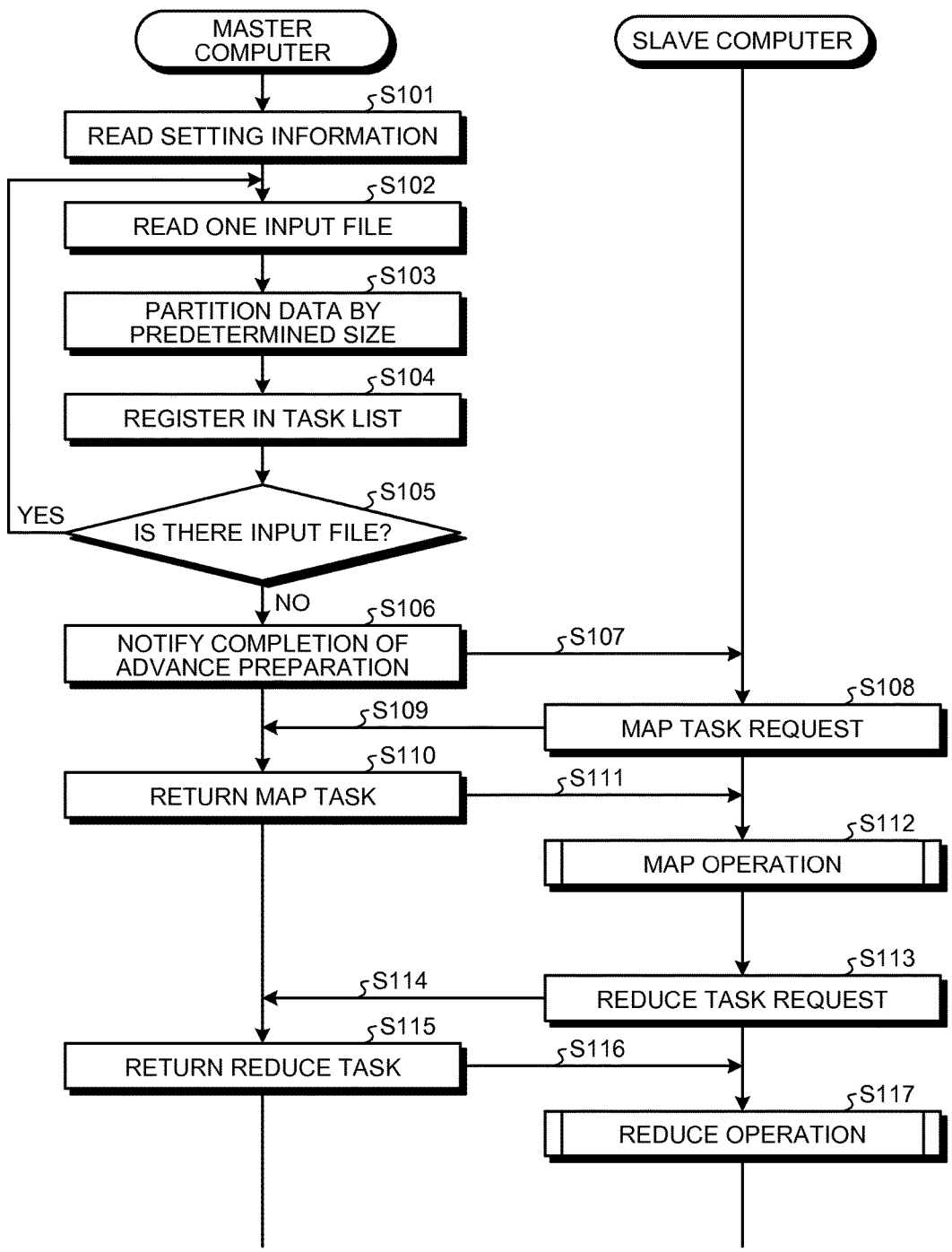
FIG. 7 is a sequence diagram that illustrates the flow of an external program execution process that is performed by the system according to the first embodiment.

Next, an explanation is given, with reference to FIG. 7, of the flow of the overall process to execute the external program by using the distributed processing system illustrated in FIG. 1. FIG. 7 is a sequence diagram that illustrates the flow of the external program execution process that is performed by the system according to the first embodiment. For ease of explanation, an explanation is given by using, for example, the single slave computer 20.

As illustrated in FIG. 7, the setting read unit 14 of the master computer 10 reads setting information from the setting file DB 12a (S101). Next, the Map task managing unit 15 reads one input file from the shared file system like HDFS (S102), where the input file is loaded from the input DB server 3 in advance, partitions the data by a predetermined size (S103), and registers them in the task list (S104). For example, the Map task managing unit 15 changes the class names of the format processing and the Map operation for registration by using the number of the input file.

If there is another input file (S105: Yes), the Map task managing unit 15 of the master computer 10 returns to Step S102 and repeats the subsequent process. Conversely, if there is no more input files (S105: No), the Map task managing unit 15 transmits, to each slave computer, a notification indicating the completion of advance preparation (S106 and S107). A configuration may be such that a slave computer makes a task request (S108) on a regular basis, or a configuration may be such that, if a slave computer makes a task request (S108), a Map task response (S110) is not returned. In the above cases, the steps S106 and S107 may be omitted.

When receiving the completion notification, the Map operation unit 24 of the slave computer 20 transmits a Map task request to the master computer 10 (S108 and S109). When receiving the request, the Map task managing unit 15 of the master computer 10 extracts the corresponding task from the task list illustrated in FIG. 4 and then returns it as a Map task to the slave computer 20 (S110 and S111).

The Map operation unit 24 of the slave computer 20 performs a Map operation in accordance with the received Map task (S112). When the Map operation is finished, the Reduce operation unit 25 transmits a Reduce task request to the master computer 10 (S113 and S114). When receiving the request, the Reduce task managing unit 16 of the master computer 10 returns the Reduce task illustrated in FIG. 5 to the slave computer 20 (S115 and S116). Afterward, the Reduce operation unit 25 of the slave computer 20 performs a Reduce operation in accordance with the received Reduce task (S117).

Map Operation

Figure 8:
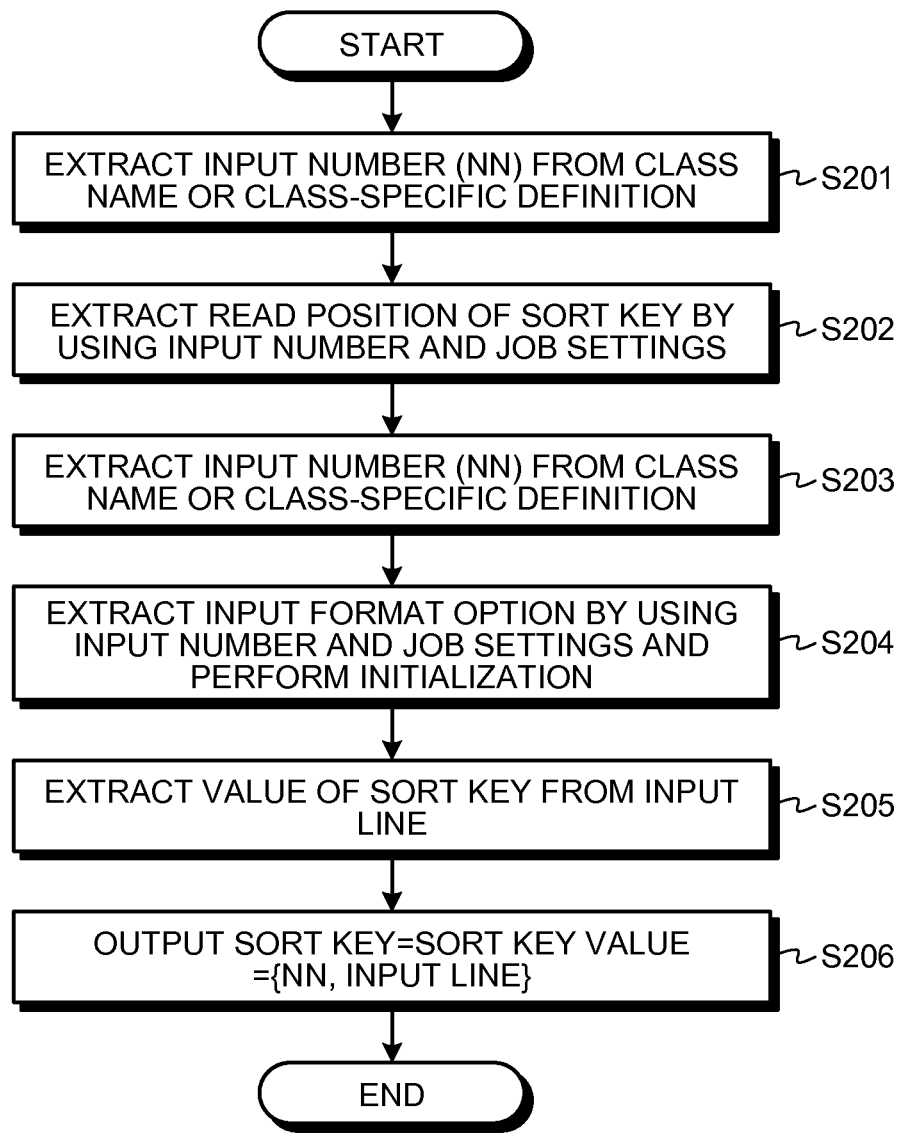
FIG. 8 is a flowchart that illustrates the flow of a Map operation according to the first embodiment.

Next, an explanation is given of the Map operation illustrated in FIG. 7. FIG. 8 is a flowchart that illustrates the flow of the Map operation according to the first embodiment. As illustrated in FIG. 8, the Map initializing unit 24a of the slave computer 20 extracts the input number (NN) from the class name or the class-specific definition (S201). For example, the Map initializing unit 24a extracts, as the above-described NN, "01" of the "main Map operation 01" in the Map task information received from the master computer 10.

The Map initializing unit 24a then extracts the read position of the sort key by using the input number (NN) and the job settings (Map task information) (S202). For example, as NN=01, the Map initializing unit 24a determines that the sort key (NN)=the sort key (01) and extracts "4BYTE~8BYTE" that is related to the "sort key=01".

The format initializing unit 24b of the Map operation unit 24 then extracts the input number (NN) from the class name or the class-specific definition (S203). For example, the format initializing unit 24b extracts "01" as the above-described NN by using the same method as that at S201.

Next, the format initializing unit 24b extracts the input format option by using the input number (NN) and the job settings (Map task information) and performs initialization (S204). For example, as NN=01, the format initializing unit 24b extracts "record length:80BYTE" that is related to the "input format processing option 01" and initializes the record length of the input file.

Afterward, the extracting unit 24c reads a record, which is a line, from the input file and then extracts the value of the sort key from the read input line (S205). The extracting unit 24c then generates a KVS-format intermediate file in which the sort key (Key) is "the value of the sort key" and the value (Value) is "NN, input line" and then outputs it to the intermediate file DB 22a (S206).

Reduce Operation

Next, an explanation is given of the Reduce operation illustrated in FIG. 7. FIG. 9 is a flowchart that illustrates the flow of the Reduce operation according to the first embodiment. As illustrated in FIG. 9, the Shuffle operation unit 25a of the Reduce operation unit 25 collects a Map task result from each slave computer (S301), sorts the collected results (S302), and then groups the sorted results by an identical key (S303).

The Reduce initializing unit 25b then performs the steps from S304 to S311 with respect to all the input numbers (NN). Specifically, the Reduce initializing unit 25b opens (generates) an input-NN temporary file in the temporary file DB 22b, which is a temporary area (S305). The Reduce initializing unit 25b then associates the input-NN temporary file with the write format processing that corresponds to the format processing NN (S306).

Afterward, the Reduce initializing unit 25b initializes the write format processing with the option of the input format processing NN (S307). For example, the Reduce initializing unit 25b initializes the output destination file with "record length:80BYTE" that corresponds to the input format processing option 01.

The Reduce initializing unit 25b then registers, in the storage unit 22, or the like, the input relation table in which the input file number NN, the temporary file name, and the output format class are related to one another (S308). As the "input file number, file name, output format class", for example, the Reduce initializing unit 25b generates "01, ./tmp/in01.txt, fixed-length format output class" or "02, ./tmp/in02.txt, with-linefeed format output class".

The Reduce initializing unit 25b then replaces the argument "% in NN" of the Reduce application designated by the job settings (Reduce task information) with the file name of the input-NN temporary file (S309). For example, the Reduce initializing unit 25b changes the Reduce application "a.out % in01% in02" to "a.out ./tmp/in01.txt ./tmp/in02.txt".

The Reduce initializing unit 25b refers to the input file environment variable name NN designated by the job settings and sets the file name of the input-NN temporary file to the environment variable (S310). For example, the Reduce initializing unit 25b sets "./tmp/in01.txt" to the environment variable "TRAN" and sets "./tmp/in02.txt" to "MASTER".

Afterward, the reconfiguring unit 25c performs the steps S312 to S316 with respect to the list of all the key values. Specifically, the reconfiguring unit 25c extracts the NN (input file number) and the input line as Value={NN, input line} (S313).

The reconfiguring unit 25c then extracts an output format class object by using the input relation table and the NN class object (S314) and outputs the input line to the temporary file via the output format class object (S315). At this time, the contents of the file are actually output.

Afterward, the reconfiguring unit 25c calls the external program for execution by using the character string of the Reduce application and the environment variable and waits until it is terminated (S317). The reconfiguring unit 25c then copies all or part of the files in the current directory to the subdirectory of the output directory in the job settings (S318).

Thus, it is possible to call and execute the external program in Hadoop without porting the external program in Hadoop or without implementing enormous complicated task definitions. As a result, it is possible to shorten the operating time, reduce human-caused mistakes, and reduce the risks associated with porting of the external program, whereby the development possibility of Hadoop can be improved.

[b] Second Embodiment

In the first embodiment, an explanation is given of a case where the file on the disk is used as the input file of the external program; however, there is no limitation on this. For example, it is possible to use what is called a named pipe. It is also possible to acquire an output file of the external program and copy it to the shared filesystem like HDFS that can be used for MapReduce input.

In a second embodiment, an explanation is given of a case where a named pipe and a shared-file system are used. The operation performed by the master computer 10, the Map operation and Shuffle operation performed by each slave computer are the same as those in the first embodiment; therefore, their explanations are omitted. Here, an explanation is given of a Reduce operation that is different from that in the first embodiment. The same process at the steps S301 to S303 in FIG. 9 is performed before the step S401 in FIG. 10A.

Initialization Process for Reduce Operation

Figure 10A:
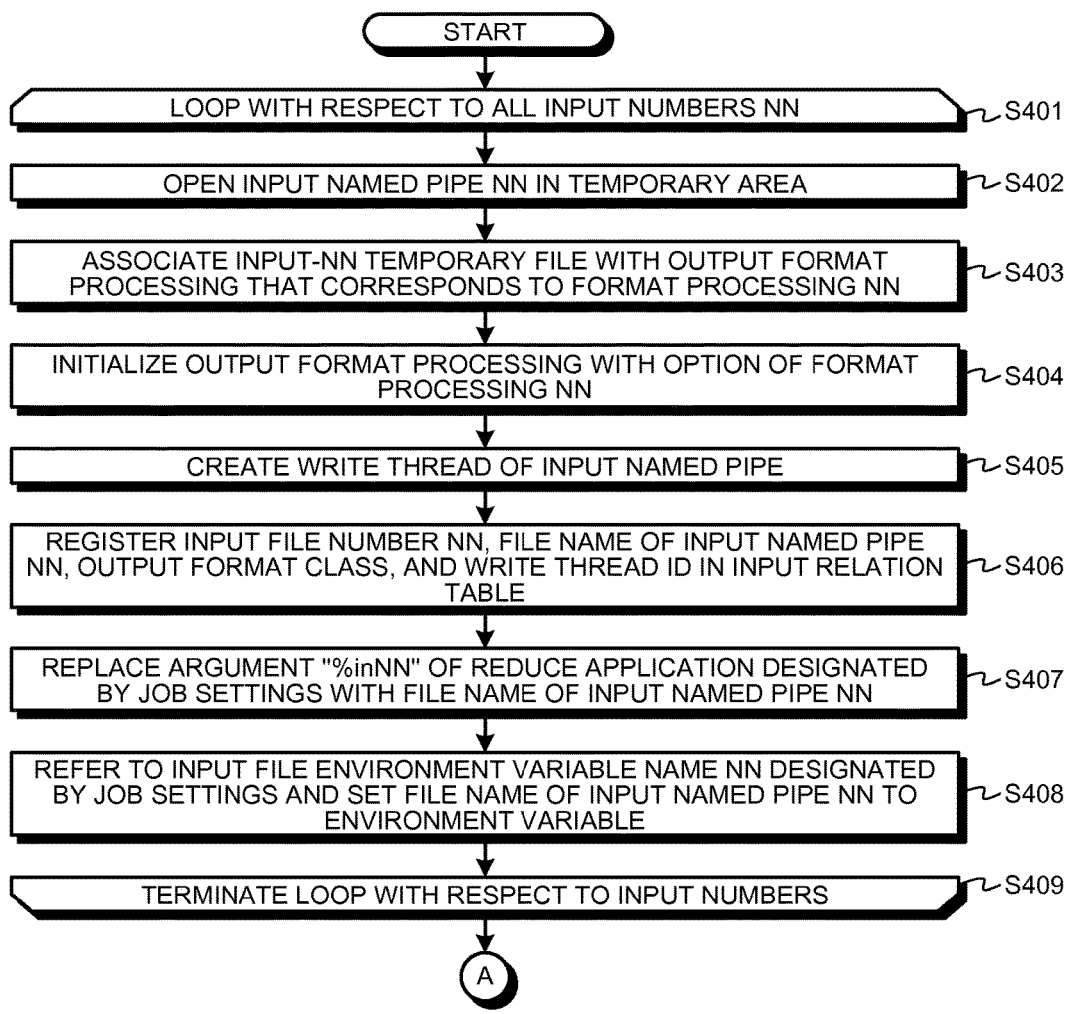
FIG. 10A is a flowchart that illustrates the flow of initialization for a Reduce operation according to a second embodiment.

FIG. 10A is a flowchart that illustrates the flow of initialization for a Reduce operation according to the second embodiment. As illustrated in FIG. 10A, the Reduce initializing unit 25b of the slave computer 20 performs the steps S401 to S409 with respect to all the input numbers (NN).

Specifically, the Reduce initializing unit 25b opens an input named pipe NN in a temporary area (S402). Here, the temporary area means, for example, the temporary file DB 22b of the storage unit 22 in the slave computer 20.

Next, the Reduce initializing unit 25b associates the input-NN temporary file with the output format processing class that corresponds to the format processing NN (S403). Afterward, the Reduce initializing unit 25b initializes the output format processing with the option of the format processing NN (S404).

The Reduce initializing unit 25b then creates a write thread of the input named pipe (S405). Afterward, the Reduce initializing unit 25b registers, in the storage unit 22, or the like, the input relation table in which the input file number NN, the file name of the input named pipe NN, the output format class, and the write thread ID are related to one another (S406).

As the "input file number, file name, output format class, write thread ID", for example, the Reduce initializing unit 25b generates "01, ./tmp/in01.txt, fixed-length format output class, thread 101". Furthermore, the Reduce initializing unit 25b generates "02, ./tmp/in02.txt, with-linefeed format output class, thread 102".

Afterward, the Reduce initializing unit 25b replaces the argument "% inNN" of the Reduce application, which is designated by the job settings, with the file name of the input named pipe NN (S407). For example, the Reduce initializing unit 25b changes the Reduce application "a.out % in01% in02 % out01% out02" to "a.out ./tmp/in01.txt ./tmp/in02.txt % out01% out02".

The Reduce initializing unit 25b then refers to the input file environment variable name NN, which is designated by the job settings, and sets the file name of the input named pipe NN to the environment variable (S408). For example, the Reduce initializing unit 25b sets "./tmp/in01.txt" to the environment variable "TRAN" and sets "./tmp/in02.txt" to "MASTER".

Figure 10B:
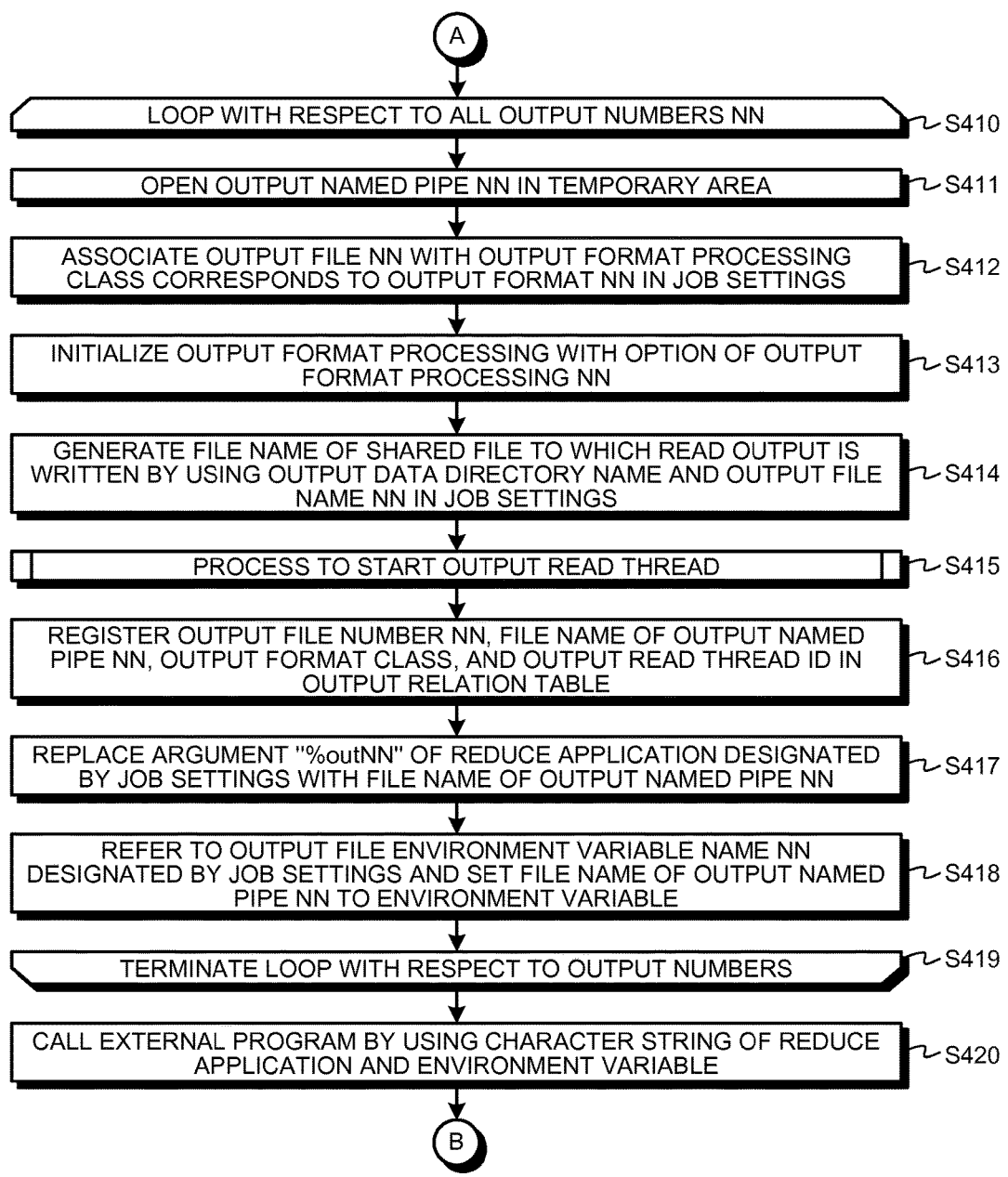
FIG. 10B is a flowchart that illustrates the flow of initialization for a Reduce operation according to a second embodiment.

Afterward, as illustrated in FIG. 10B, the Reduce initializing unit 25b performs the steps S410 to S419 with respect to all the output numbers (NN). Specifically, the Reduce initializing unit 25b opens an output named pipe NN in a temporary area (S411). Here, the temporary area means, for example, the temporary file DB 22b of the storage unit 22 in the slave computer 20.

Next, the Reduce initializing unit 25b associates the output file NN with the output format processing class that corresponds to the output format processing NN in the job settings (S412). Afterward, the Reduce initializing unit 25b initializes the output format processing with the option of the output format processing NN (S413).

The Reduce initializing unit 25b then generates the file name of the shared file to which read output is written by using the output data directory name and the output file name NN in the job settings (S414). The Reduce initializing unit 25b then performs a process to start an output read thread (S415).

When the start process at S415 is completed, the Reduce initializing unit 25b performs the step at S416. Specifically, the Reduce initializing unit 25b registers, in the storage unit 22, or the like, the output relation table in which the output file number NN, the file name of the output named pipe NN, the output format class, the output read thread ID, and the file name of the shared file are related to one another. For example, the Reduce initializing unit 25b generates "01, ./tmp/out01.txt, with-linefeed format output class, thread 103, /output/processed.txt" or "02, ./tmp/out02.txt, fixed-length format output class, thread 104, /output/error.txt".

Afterward, the Reduce initializing unit 25b replaces the argument "% outNN" of the Reduce application, which is designated by the job settings, with the file name of the output named pipe NN (S417). For example, the Reduce initializing unit 25b changes the Reduce application "a.out ./tmp/in01.txt ./tmpin02.txt % out01% out02" to "a.out ./tmp/in01.txt ./tmp/in02.txt ./tmp/out01.txt ./tmp/out02.txt".

The Reduce initializing unit 25b then refers to the output file environment variable name NN, which is designated by the job settings, and sets the file name of the output named pipe NN to the environment variable (S418). The reconfiguring unit 25c then calls the external program by using the character string of the Reduce application and the environment variable (S420).

Main Process and Completion Process of Reduce Operation

Figure 11:
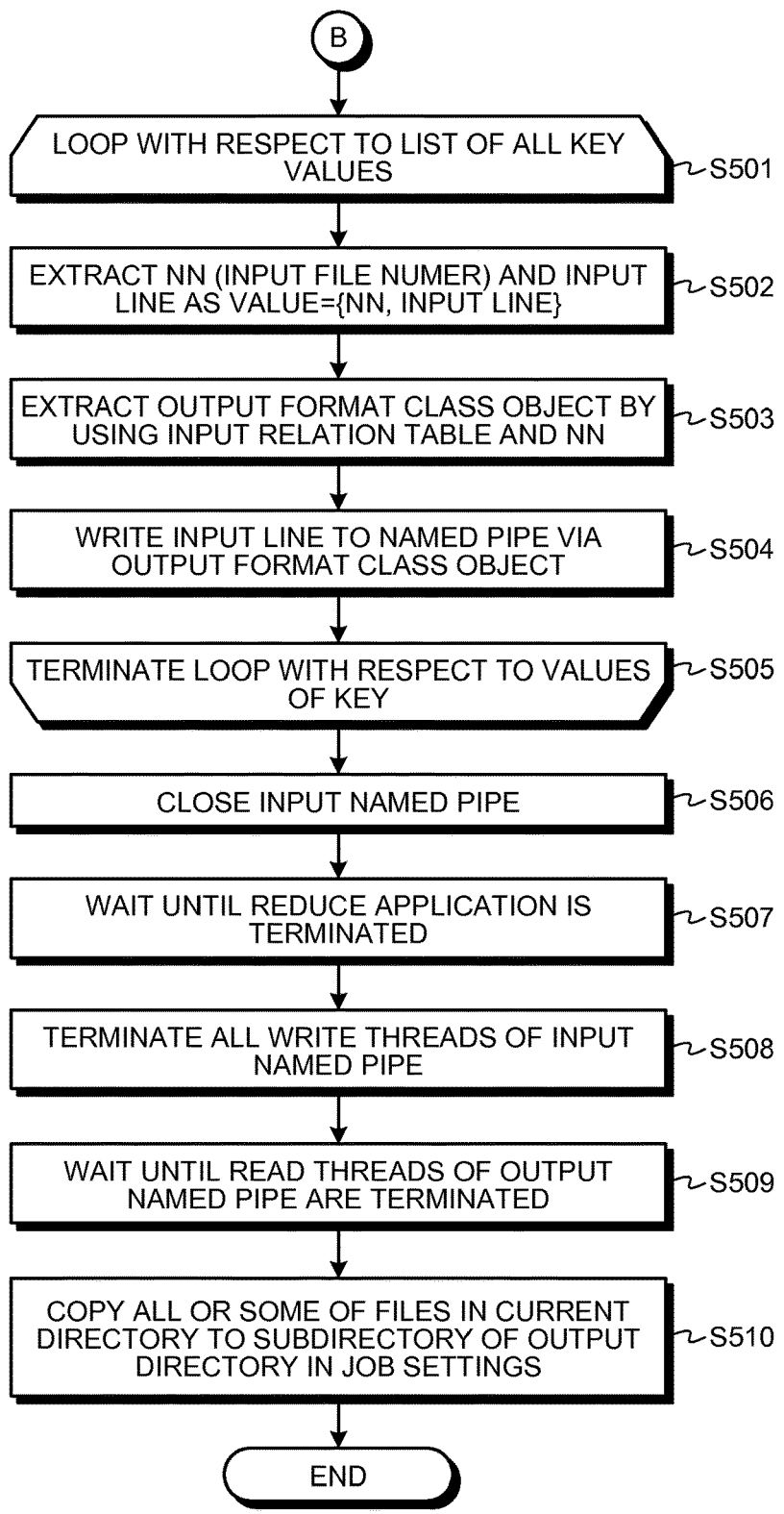
FIG. 11 is a flowchart that illustrates the flow of the main process and the completion process of the Reduce operation according to the second embodiment.

Next, an explanation is given of the main process and the completion process of a Reduce operation. FIG. 11 is a flowchart that illustrates the flow of the main process and the completion process of the Reduce operation according to the second embodiment. As illustrated in FIG. 11, the reconfiguring unit 25c of the slave computer 20 performs the steps at S501 to S505 with respect to the list of all key values. Specifically, the reconfiguring unit 25c extracts NN (input file number) and the input line as Value={NN, input line} (S502).

The reconfiguring unit 25c then extracts the output format class object by using the input relation table and the NN (S503) and writes the input line to the named pipe via the output format class object (S504).

The reconfiguring unit 25c then closes the input named pipe (S506) and waits until the Reduce application is terminated (S507). The reconfiguring unit 25c then terminates all the write threads of the input named pipe (S508).

Next, the reconfiguring unit 25c waits until all the read threads of the output named pipe are terminated (S509). The reconfiguring unit 25c then copies all or some of the files in the current directory to the subdirectory of the output directory in the job settings (S510).

Thread Start Process

Figure 12:
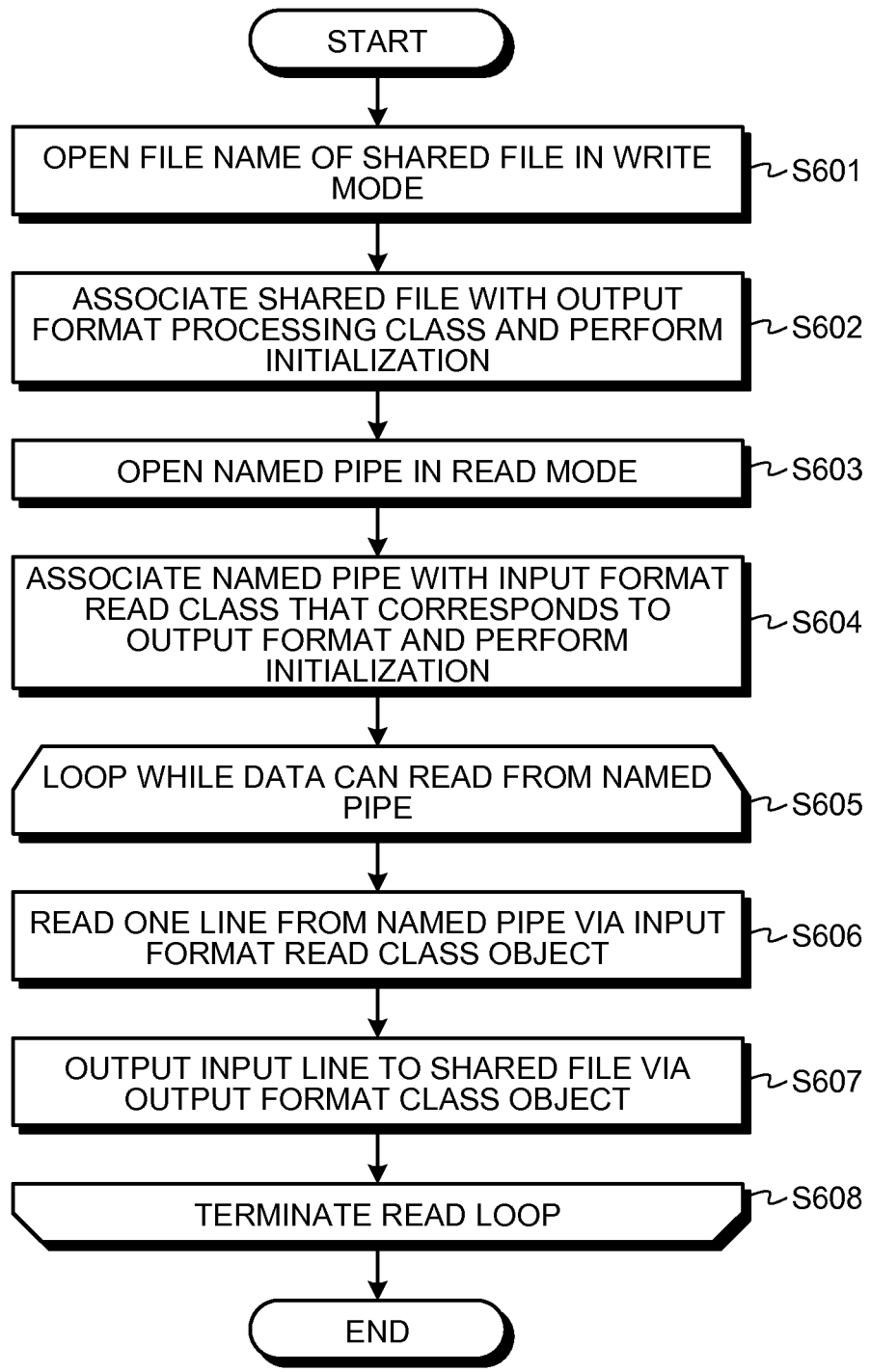
FIG. 12 is a flowchart that illustrates the flow of the output read thread start process according to the second embodiment.

Next, an explanation is given of the thread start process illustrated at the step S415 in FIG. 10B. FIG. 12 is a flowchart that illustrates the flow of the output read thread start process according to the second embodiment. As illustrated in FIG. 12, the Reduce initializing unit 25b opens the file name of the shared file in the write mode (S601), associates the shared file with the output format processing class, and performs initialization (S602).

Afterward, the Reduce initializing unit 25b opens the named pipe in the read mode (S603), associates the named pipe with the input format read class that corresponds to the output format, and performs initialization (S604).

The reconfiguring unit 25c then repeats the steps at S605 to S608 while data can be read from the named pipe. Specifically, the reconfiguring unit 25c reads one line from the named pipe via the input format read class object (S606). The reconfiguring unit 25c then outputs the input line to the shared file via the output format class object (S607).

[c] Third Embodiment

Next, an explanation is given of a case where the product master file and the sales specification file are used as the input file 01 and the input file 02 and the join program is read and executed within Hadoop, the join program being implemented by using NetCOBOL that is different from the Java framework used for Hadoop. In a third embodiment, an explanation is given of a case where a single Map operation is assigned to a single slave computer; however, there is no limitation on this. Assignment of a Map operation may be appropriately changed depending on the amount of input data, the number of slave computers, or the like.

Figure 13:
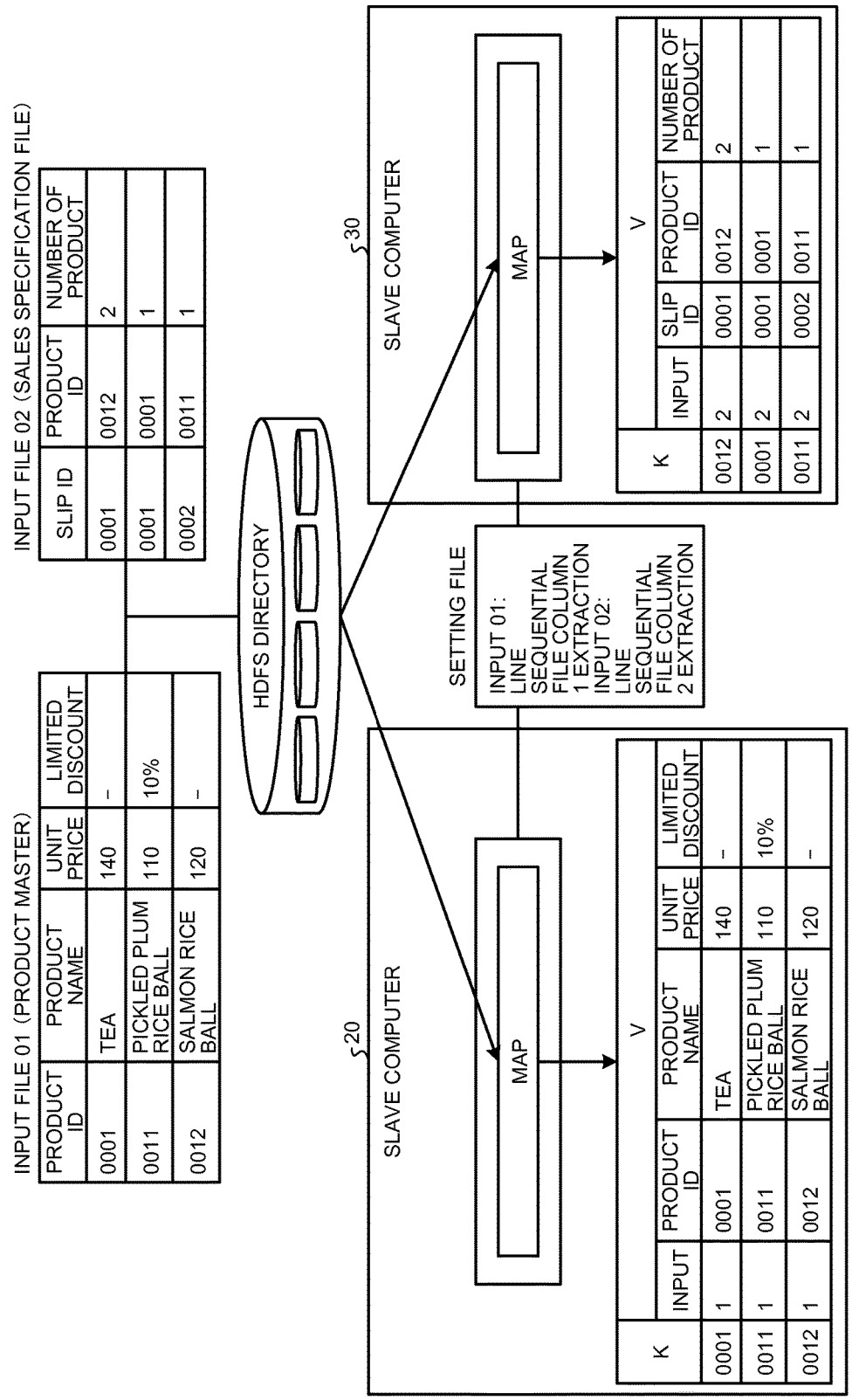
FIG. 13 is a diagram that illustrates the specific example of the Map operation.
Figure 14:
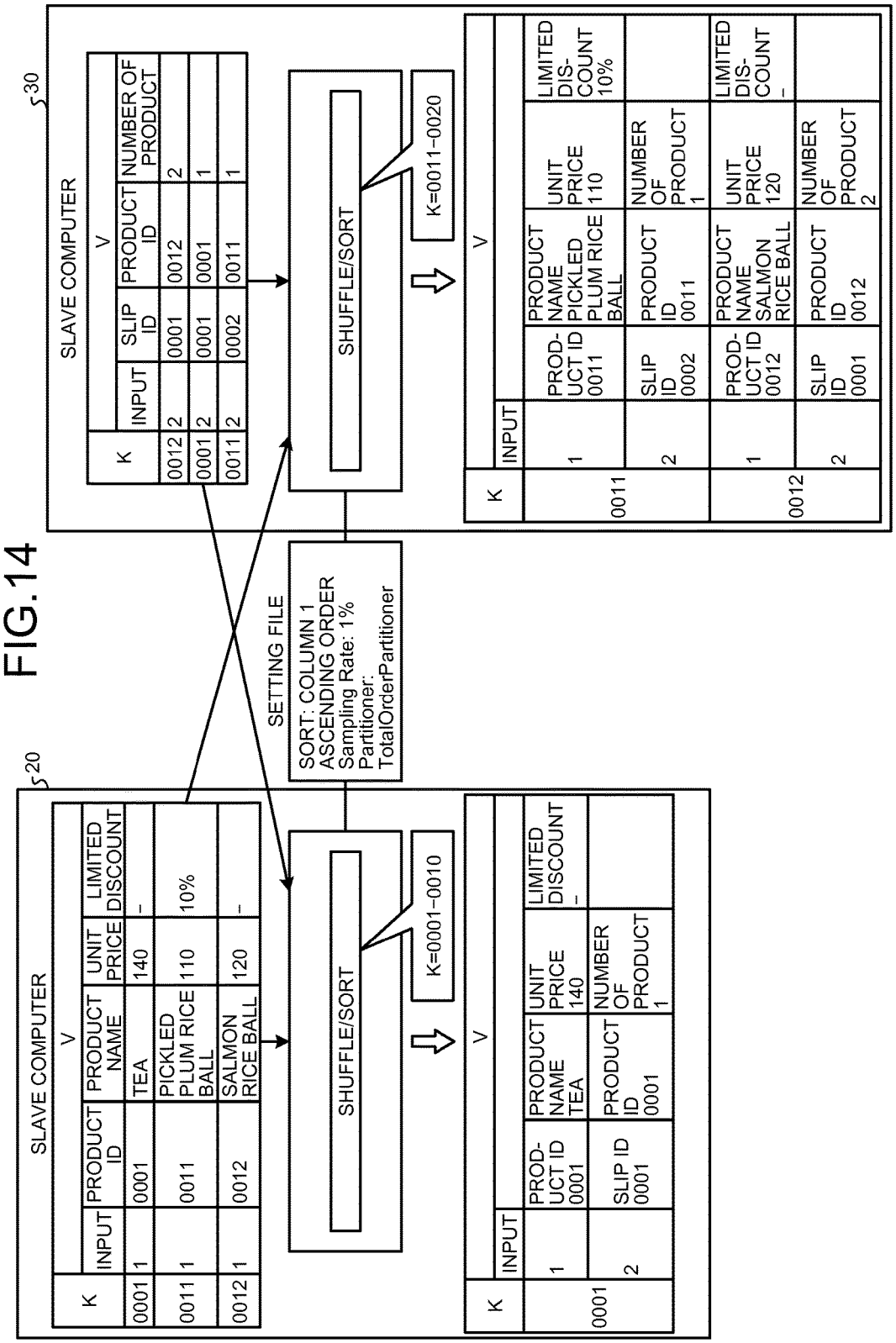
FIG. 14 is a diagram that illustrates the specific example of a shuffle/sort operation.
Figure 15:
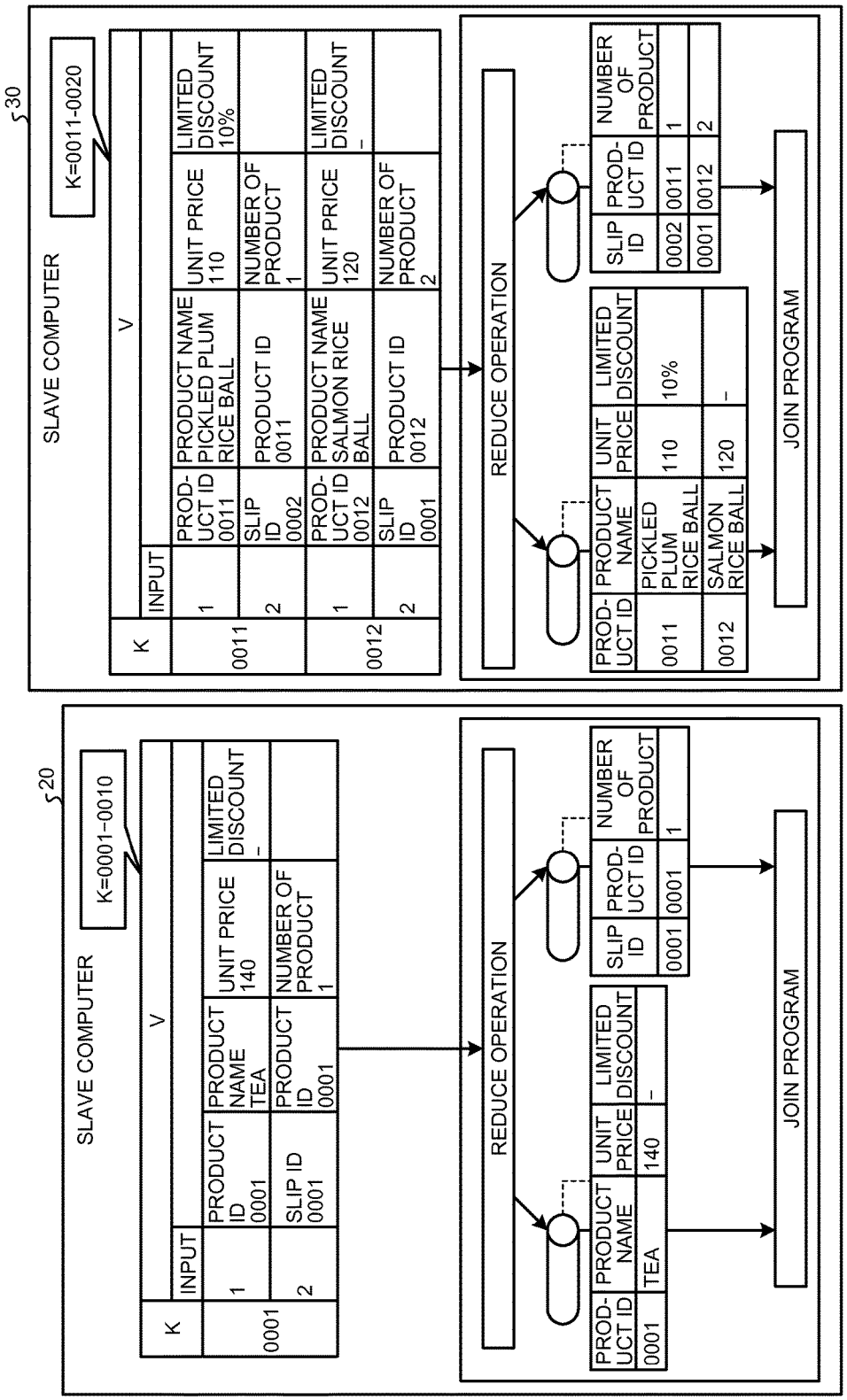
FIG. 15 is a diagram that illustrates the specific example of the Reduce operation.
Figure 16:
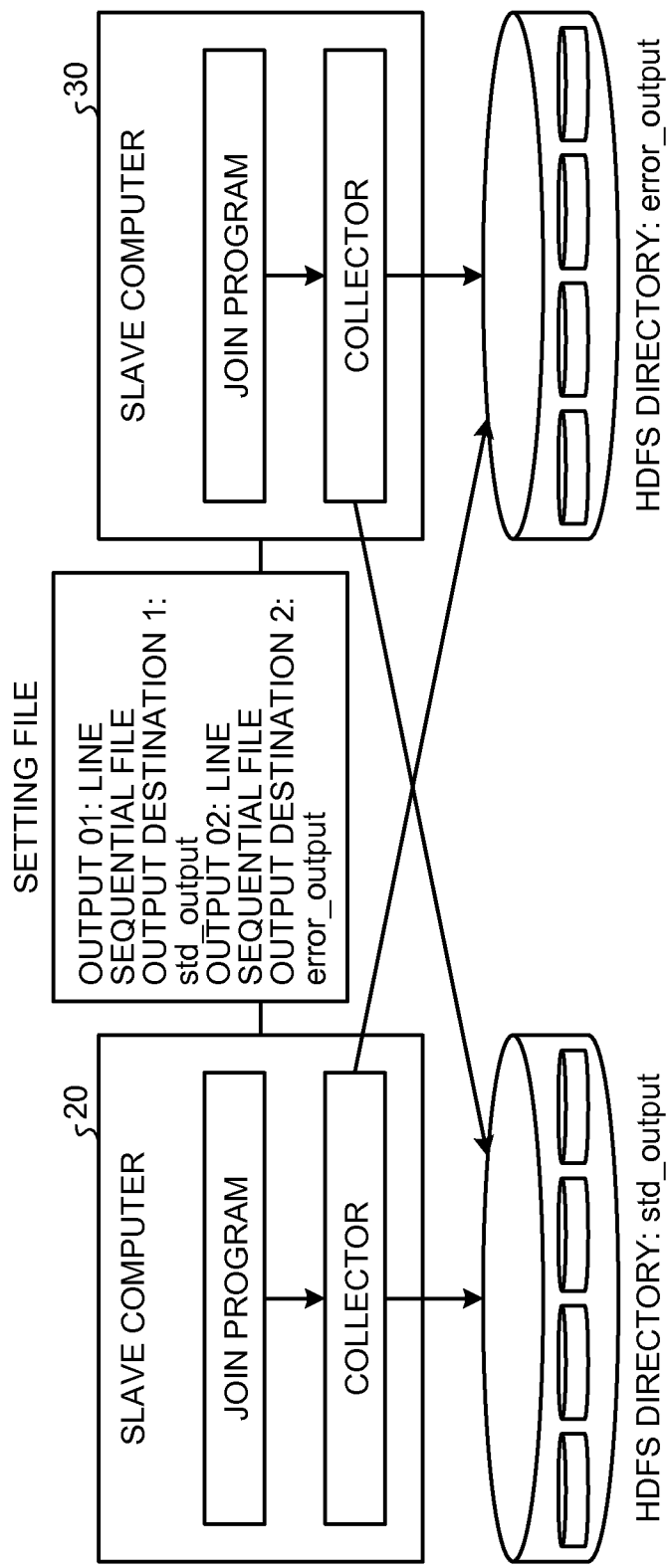
FIG. 16 is a diagram that illustrates the specific example of the output destination after a join program is performed.

FIG. 13 is a diagram that illustrates the specific example of a Map operation. FIG. 14 is a diagram that illustrates the specific example of a shuffle/sort operation. FIG. 15 is a diagram that illustrates the specific example of a Reduce operation. FIG. 16 is a diagram that illustrates the specific example of the output destination after the join program is performed.

As illustrated in FIG. 13, the HDFS directory, which can be accessed by each slave computer, stores therein the input file 01 and the input file 02 that are to be processed by the join program.

The input file 01 is a product master file that stores therein, as "product ID, product name, unit price, limited discount", "0001, tea, 140, -", "0011, pickled plum rice ball, 110, 10%", and "0012, salmon rice ball, 120, -". The input file 02 is a sales specification file that stores therein, as "slip ID, product ID, number of products", "0001, 0012, 2", "0001, 0001, 1", and "0002, 0011, 1".

Each slave computer reads the setting file in which "input 01: line sequential file column 1 extraction, input 02: line sequential file column 2 extraction" is described. With such a condition, the master computer 10 has designated a Map task to process the input file 01 to the slave computer 20. In accordance with the setting file "input 01: line sequential file column 1 extraction", the slave computer 20 sets the "product ID" that is the column 1 of the input file 01 to the key.

The slave computer 20 then extracts the product ID from each record as the key and generates a KVS-format intermediate file in which the extracted key, information indicating the extraction-source input file, and the extraction-source record are related to one another. For example, with respect to the record with the product ID of 0001, the slave computer 20 generates, as "Key, Value", "K (0001), V (1, 0001, tea, 140, -)" and stores it in the intermediate file.

The master computer 10 also has designated a Map task to process the input file 02 to the slave computer 30. In accordance with the setting file "input 02: line sequential file column 2 extraction", the slave computer 30 sets the "product ID" that is the column 2 of the input file 02 to the key.

The slave computer 30 then extracts the product ID from each record as the key and generates a KVS-format intermediate file in which the extracted key, information indicating the extraction-source input file, and the extraction-source record are related to one another. For example, with respect to the record with the slip ID of 0001, the slave computer 30 extracts the product ID "0012" as the key, generates, as "Key, Value", "K (0012), V (2, 0001, 0012, 2)" and stores it in the intermediate file.

As illustrated in FIG. 14, as the slave computer 20 has been designated by the master computer 10 to handle data in the range of the keys "0001-0010", the slave computer 20 then acquires corresponding data and performs shuffling/sorting. Specifically, the slave computer 20 reads the records in the range of the "Key" "0001-0010" from the Map operation result of this computer and the Map operation result of the slave computer 30 and then sorts them by using the corresponding Key.

For example, the slave computer 20 acquires "K (0001), V (1, 0001, tea, 140, -)" from the Map operation result of this computer and acquires "K (0001), V (2, 0001, 0001, 1)" from the Map operation result of the slave computer 30. The slave computer 20 then sorts them and outputs, to the intermediate file, the record in which K (0001) is related to V {input (1), product ID (0001), product name (tea), unit price (140), limited discount (-)}. The slave computer 20 also outputs, to the intermediate file, the record in which K (0001) is related to V {input (2), slip ID (0001), product ID (0001), number of products (1)}.

Similarly, the slave computer 30 has been designated by the master computer 10 to handle data in the range of the keys "0011-0020" so that the slave computer 30 acquires corresponding data and performs shuffling/sorting. Specifically, the slave computer 30 reads the records in the range of the "Key" "0011-0020" from the Map operation result of this computer and the Map operation result of the slave computer 20 and then sorts them by using the corresponding Key.

For example, the slave computer 30 acquires "K (0011), V (1, 0011, pickled plum rice ball, 110, 10%)" and "K (0012), V (1, 0012, salmon rice ball, 120, -)" from the Map operation result of the slave computer 20. Furthermore, the slave computer 30 acquires "K (0012), V (2, 0001, 0012, 2)" and "K (0011), V (2, 0002, 0011, 1)" from the Map operation result of this computer.

The slave computer 30 then sorts them and outputs, to the intermediate file, the record in which K (0011) is related to V {input (1), product ID (0011), product name (pickled plum rice ball), unit price (110), limited discount (10%)}. The slave computer 30 also outputs, to the intermediate file, the record in which K (0011) is related to V {input (2), slip ID (0002), product ID (0011), number of products (1)}.

Furthermore, the slave computer 30 then sorts them and outputs, to the intermediate file, the record in which K (0012) is related to V {input (1), product ID (0012), product name (salmon rice ball), unit price (120), limited discount (-)}. The slave computer 30 also outputs, to the intermediate file, the record in which K (0012) is related to V {input (2), slip ID (0001), product ID (0012), number of products (2)}.

As illustrated in FIG. 15, the slave computer 20 then performs a Reduce operation on the result that is obtained by shuffling/sorting. Specifically, the slave computer 20 extracts V {input (1), product ID (0001), product name (tea), unit price (140), limited discount (-)} from "K (0001), V {input (1), product ID (0001), product name (tea), unit price (140), limited discount (-)}". The slave computer 20 then deletes input (1) from the extracted V {input (1), product ID (0001), product name (tea), unit price (140), limited discount (-)} and then converts it into a record that has the same format as that of the input file. Afterward, the slave computer 20 inputs the converted "product ID (0001), product name (tea), unit price (140), limited discount (-)" to the input file 01 named pipe.

The slave computer 20 also extracts V {input (2), slip ID (0001), product ID (0001), number of products (1)} from "K (0001), V {input (2), slip ID (0001), product ID (0001), number of products (1)}". The slave computer 20 then deletes input (2) from the extracted V {input (2), slip ID (0001), product ID (0001), number of products (1)} and then converts it into a record that has the same format as that of the input file. Afterward, the slave computer 20 inputs the converted "slip ID (0001), product ID (0001), number of products (1)" to the input file 02 named pipe.

Furthermore, the slave computer 30 extracts V {input (1), product ID (0011), product name (pickled plum rice ball), unit price (110), limited discount (10%)} from "K (0011), V {input (1), product ID (0011), product name (pickled plum rice ball), unit price (110), limited discount (10%)}". The slave computer 30 then deletes input (1) from the extracted V {input (1), product ID (0011), product name (pickled plum rice ball), unit price (110), limited discount (10%)} and then converts it into a record that has the same format as that of the input file. Afterward, the slave computer 30 inputs the converted "product ID (0011), product name (pickled plum rice ball), unit price (110), limited discount (10%)" to the input file 01 named pipe.

Moreover, the slave computer 30 extracts V {input (2), slip ID (0002), product ID (0011), number of products (1)} from "K (0011), V {input (2), slip ID (0002), product ID (0011), number of products (1)}". The slave computer 30 then deletes input (2) from the extracted V {input (2), slip ID (0002), product ID (0011), number of products (1)} and then converts it into a record that has the same format as that of the input file. Afterward, the slave computer 30 inputs the converted "slip ID (0002), product ID (0011), number of products (1)" to the input file 02 named pipe.

Moreover, the slave computer 30 extracts V {input (1), product ID (0012), product name (salmon rice ball), unit price (120), limited discount (-)} from "K (0012), V {input (1), product ID (0012), product name (salmon rice ball), unit price (120), limited discount (-)}". The slave computer 30 then deletes input (1) from the extracted V {input (1), product ID (0012), product name (salmon rice ball), unit price (120), limited discount (-)} and then converts it into a record that has the same format as that of the input file. Afterward, the slave computer 30 inputs the converted "product ID (0012), product name (salmon rice ball), unit price (120), limited discount (-)" to the input file 01 named pipe.

The slave computer 30 also extracts V {input (2), slip ID (0001), product ID (0012), number of products (2)} from "K (0012), V {input (2), slip ID (0001), product ID (0012), number of products (2)}". The slave computer 30 then deletes input (2) from the extracted V {input (2), slip ID (0001), product ID (0012), number of products (2)} and then converts it into a record that has the same format as that of the input file. Afterward, the slave computer 30 inputs the converted "slip ID (0001), product ID (0012), number of products (2)" to the input file 02 named pipe.

Afterward, as illustrated in FIG. 16, the slave computer 20 outputs the operation result of the join program to the shared HDFS directory. Specifically, the slave computer 20 outputs a normal operation result to "std_output" designated by the setting file and outputs an abnormal operation result to "error_output" designated by the setting file. The slave computer 30 also outputs the operation result to the shared HDFS directory.

With the above-described system, the external program that performs joining by using multiple inputs can be called in the MapReduce framework without modifying the external program; therefore, it is possible to improve the development productivity of Hadoop and external programs.

Furthermore, in the above-described system, instead of using a file on the disk as an input file of the external program, a named pipe can be used; therefore, writing the input record can be performed concurrently with executing the existing program, which increases the speed of operations. Furthermore, inter process communication, i.e., memory-to-memory copying, which is faster than writing to the disk, can be used; therefore, throughput is improved. Moreover, it is possible to reduce memory usage by synchronizing the outputs to all the input files.

Furthermore, with the above-described system, it is possible to collect the output file of the existing program and copy it to the shared-file system that can be used for input of MapReduce. Moreover, with the above-described system, a named pipe is used as an output file of the external program so that a record can be written to the shared-file system at the same time that the external program writes the record.

[d] Fourth Embodiment

The embodiments of the present invention have been described above; however, the present invention may be embodied in various different embodiments other than the above-described embodiments. In the following, a different embodiment will be explained.

System

Among the processes described in the embodiments, all or some of the processes that are automatically performed as described above can be performed manually. Furthermore, all or some of the processes that are manually performed as described above can be performed automatically by using a well-known method. Furthermore, the operation procedures, the control procedures, the specific names, and the information including various types of data and parameters as described in the above specifications and the drawings can be arbitrarily changed except as otherwise noted.

The components of each device illustrated are functionally conceptual, and the components are not always physically configured as illustrated in the drawings. Specifically, specific forms of separation and combination of each device are not limited to those depicted in the drawings. A configuration may be such that all or some of devices are functionally or physically separated or combined in an arbitrary unit depending on various types of loads or usage. Furthermore, all or any of various processing functions performed by each device may be implemented by a CPU and the program analyzed and executed by the CPU or may be implemented as wired logic hardware.

Hardware Configuration

Various types of processes that are described in the above embodiments may be performed when prepared programs are executed by a computer system, such as a personal computer or workstation. In the following, an explanation is given of an example of a computer that executes the program that has the same functionality as that in the above embodiment.

Figure 17:
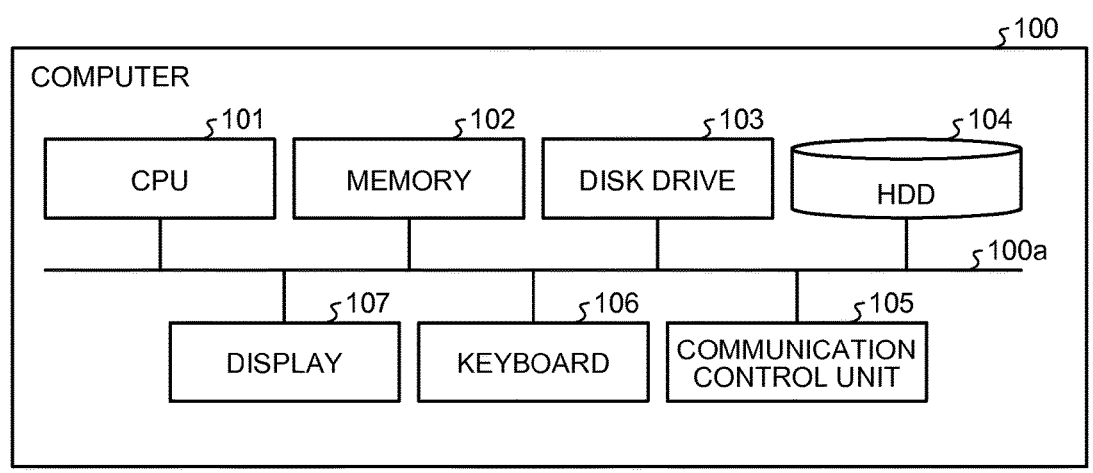
FIG. 17 is a diagram that illustrates an example of a hardware configuration.

FIG. 17 is a diagram that illustrates an example of a hardware configuration. As illustrated in FIG. 17, a computer 100 includes a CPU 101, a memory 102, a disk drive 103, a hard disk drive (HDD) 104, a communication control unit 105, a keyboard 106, and a display 107. The units illustrated in FIG. 17 are connected to one another via a bus 100a.

The communication control unit 105 is an interface, such as a network interface card (NIC). The HDD 104 stores therein the program that executes the functions illustrated in FIG. 2, FIG. 6, and the like, and stores therein each of the tables, or the like, described in the first and second embodiments. The HDD 104 is given as an example of a recording medium; however, various types of programs may be stored in a recording medium, such as a read only memory (ROM), RAM, or CD-ROM, that is readable by another computer, and the programs may be read by the computer. Furthermore, a recording medium may be installed in a remote location, and the computer may access the recording medium and acquire and use the program. At that time, the acquired program may be stored in a recording medium of a GW device itself and may be used.

The CPU 101 reads the program that performs the same operation as that of each of the processing units illustrated in FIG. 2 and loads the program to the RAM so that the process to execute each of the functions illustrated in FIG. 2, and the like, is performed. Specifically, this process executes the setting read unit 14, the Map task managing unit 15, and the Reduce task managing unit 16. Thus, the computer 100 reads and executes the program so as to operate as the master computer 10.

Furthermore, the CPU 101 reads the program that performs the same operation as that of each of the processing units illustrated in FIG. 6 and loads the program to the RAM so that the process to execute each of the functions illustrated in FIG. 6, and the like, is performed. Specifically, this process executes the Map initializing unit 24a, the format initializing unit 24b, the extracting unit 24c, the Shuffle operation unit 25a, the Reduce initializing unit 25b, and the reconfiguring unit 25c. Thus, the computer 100 reads and executes the program so as to operate as the slave computer 20.

Furthermore, the computer 100 reads the above-described program from the recording medium by using a medium read device and executes the read program so as to perform the same function as that in the above-described embodiment. The program described in this embodiment is not limited to that executed by the computer 100. For example, the present invention may be also applied to a case where a different computer or server executes the program or they cooperate with each other so as to execute the program.

According to one aspect of the present invention, it is possible to reduce constraints on the execution of an external program, which uses multiple inputs as a target for processing, in a distributed processing system.

All examples and conditional language recited herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A non-transitory computer-readable recording medium having stored therein an execution control program that causes a computer to execute a process comprising:
   inputting a plurality of input files that have different formats;
   generating, from the plurality of input files, first intermediate files respectively, the first intermediate files having data added as a join key in a column of a type that is common across the different formats of the plurality of input files and data added as an input number that indicates a respective input file;
   generating second intermediate files by sorting data in the first intermediate files in accordance with the join key, a second intermediate file among the second intermediate files generated including the join key and the input number in association with data of a respective input file among the plurality of input files;
   generating a plurality of output files for each input number, an output file among the plurality of output files generated including the data of the respective input file which is extracted from a second intermediate file among the second intermediate files based on the input number that indicates the respective input file and being in a same format as the respective input file; and
   inputting the plurality of output files generated to a join program that processes joining data.

2. The non-transitory computer-readable recording medium according to claim 1, wherein
   the generating of the plurality of output files includes extracting corresponding data record by record that has a format of a corresponding input file among the plurality of input files from the second intermediate files, respectively, and
   the inputting of the plurality of output files includes, each time a record of the corresponding data is extracted from the second intermediate files, outputting the extracted record to the join program via an inter-process communication.

3. The non-transitory computer-readable recording medium according to claim 1, wherein the process further comprises:
   storing a processing result of the join program in a shared-file system on a distributed processing system that performs distributed processing on data stored in a plurality of computers including the computer in a distributed manner, the shared-file system being shared by the plurality of computers.

4. The non-transitory computer-readable recording medium according to claim 3, wherein the storing includes, each time the join program outputs the processing result, storing the processing result in the shared-file system via an inter-process communication.

5. An execution control method comprising:
   reading a plurality of input files that have different formats;
   generating, from the plurality of input files, first intermediate files respectively, the first intermediate files having data added as a join key in a column of a type that is common across the different formats of the plurality of input files and data added as an input number that indicates a respective input file;
   generating second intermediate files by sorting data in the first intermediate files in accordance with the join key, a second intermediate file among the second intermediate files generated including the join key and the input number in association with data of a respective input file among the plurality of input files;
   generating, by a computer, a plurality of output files for each input number, an output file among the plurality of output files generated including data that the data of the respective input file which is extracted from a second intermediate file among the second intermediate files based on the input number that indicates the respective input file and being in a same format as the respective input file; and
   inputting the plurality of output files generated to a join program that joins data.

6. An information processing apparatus comprising:
   a memory; and
   a processor coupled to the memory, wherein the processor executes a process comprising:
   reading a plurality of input files that have different formats;
   generating, from the plurality of input files, first intermediate files respectively, the first intermediate files having data added as a join key in a column of a type that is common across the different formats the plurality of input files and data added as an input number that indicates a respective input file;
   generating second intermediate files by sorting data in the first intermediate files in accordance with the join key, a second intermediate file among the second intermediate files generated including the join key and the input number in association with data of a respective input file among the plurality of input files;
   generating a plurality of output files for each input number, an output file among the plurality of output files generated including the data of the respective input file which is extracted from a second intermediate file among the second intermediate files based on the input number that indicates the respective input file and being in a same format as the respective input file; and
   inputting the plurality of output files generated to a join program that joins data.

7. The non-transitory computer-readable recording medium according to claim 1, wherein
   the process is operating on a first software framework, and formats of the plurality of output files respectively correspond to the different formats of the plurality of input files and are able to be processed by the join program that operates on a second software framework.

8. The non-transitory computer-readable recording medium according to claim 1, wherein the inputting the plurality of output files generated to the join program is performed according to correspondence between the plurality of output files generated to correspond to the different formats of the plurality of input files, respectively.

9. The non-transitory computer-readable recording medium according to claim 1, wherein the data of the respective input file extracted from the second intermediate file among the second intermediate files indicates a format of the respective input file.

10. The non-transitory computer-readable recording medium according to claim 1, comprising:

reading record of the plurality of input files, respectively, and generating the output file of the respective input file with the format that corresponds to the format of the respective input file.

\* \* \* \* \*